US011105923B2

(12) United States Patent
Yoshida et al.

(10) Patent No.: US 11,105,923 B2
(45) Date of Patent: Aug. 31, 2021

(54) DRIVING SUPPORT APPARATUS

(71) Applicant: PANASONIC INTELLECTUAL PROPERTY MANAGEMENT CO., LTD., Osaka (JP)

(72) Inventors: Takashi Yoshida, Kanagawa Ken (JP); Yoshimasa Okabe, Kanagawa Ken (JP); Masayoshi Michiguchi, Kanagawa Ken (JP); Yuichiro Aihara, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 16/664,163

(22) Filed: Oct. 25, 2019

(65) Prior Publication Data

US 2020/0142059 A1 May 7, 2020

(30) Foreign Application Priority Data

Nov. 1, 2018 (JP) .............................. JP2018-206949

(51) Int. Cl.
*G01S 15/93* (2020.01)
*B60W 30/08* (2012.01)
*G01S 15/87* (2006.01)
*B60W 40/02* (2006.01)
*B60R 21/0136* (2006.01)
(Continued)

(52) U.S. Cl.
CPC ............. *G01S 15/93* (2013.01); *B60W 30/08* (2013.01); *B60W 40/02* (2013.01); *G01S 15/87* (2013.01); *B60W 2420/54* (2013.01); *B60W 2554/00* (2020.02); *B60W 2555/20* (2020.02)

(58) Field of Classification Search
CPC ...................................................... G01S 13/93
See application file for complete search history.

(56) References Cited

U.S. PATENT DOCUMENTS

2009/0146865 A1* 6/2009 Watanabe ............. G01S 13/931
342/27
2010/0106356 A1* 4/2010 Trepagnier ............... G08G 1/16
701/25
(Continued)

FOREIGN PATENT DOCUMENTS

JP 2012-127863 7/2012
JP 2013-088279 5/2013
(Continued)

*Primary Examiner* — Joseph H Feild
*Assistant Examiner* — Pameshanand Mahase
(74) *Attorney, Agent, or Firm* — Greenblum & Bernstein, P.L.C.

(57) ABSTRACT

A driving support apparatus according to the present disclosure includes a memory and a hardware processor coupled to the memory and a sound wave sensor. The hardware processor is configured to select, as a transmission and reception scheme, either a pulse scheme or a spread spectrum modulation scheme, and control the sound wave sensor with the selected transmission and reception scheme. When the spread spectrum modulation scheme is selected as the transmission and reception scheme, the hardware processor causes the sound wave sensor to successively transmit and receive sound waves by using the spread spectrum modulation scheme.

17 Claims, 32 Drawing Sheets

(51) Int. Cl.
    *G01S 13/931*     (2020.01)
    *B60R 21/013*     (2006.01)

(56) References Cited

U.S. PATENT DOCUMENTS

| | | | | |
|---|---|---|---|---|
| 2012/0169523 A1* | 7/2012 | Lee | G01S 13/345 | 342/21 |
| 2015/0247924 A1* | 9/2015 | Kishigami | G01S 13/931 | 342/70 |
| 2018/0024234 A1* | 1/2018 | Ishida | G01S 7/02 | 342/152 |
| 2019/0276030 A1* | 9/2019 | Maeda | G01S 7/5276 | |
| 2019/0377077 A1* | 12/2019 | Kitayama | G01S 13/931 | |

FOREIGN PATENT DOCUMENTS

| | | |
|---|---|---|
| JP | 2018-072105 | 5/2018 |
| JP | 2018-081050 | 5/2018 |

\* cited by examiner

FIG.21

| M-SEQUENCE PN CODE | 1 | 1 | 1 | 0 | 1 | 0 | 0 | (NUMBER OF MATCHES) - (NUMBER OF MISMATCHES) |
|---|---|---|---|---|---|---|---|---|
| DELAY 0T | 1 | 1 | 1 | 0 | 1 | 0 | 0 | 7 - 0 = 7 |
| DELAY 1T | 0 | 1 | 1 | 1 | 0 | 1 | 0 | 3 - 4 = -1 |
| DELAY 2T | 0 | 0 | 1 | 1 | 1 | 0 | 1 | 3 - 4 = -1 |
| DELAY 3T | 1 | 0 | 0 | 1 | 1 | 1 | 0 | 3 - 4 = -1 |
| DELAY 4T | 0 | 1 | 0 | 0 | 1 | 1 | 1 | 3 - 4 = -1 |
| DELAY 5T | 1 | 0 | 1 | 0 | 0 | 1 | 1 | 3 - 4 = -1 |
| DELAY 6T | 1 | 1 | 0 | 1 | 0 | 0 | 1 | 3 - 4 = -1 |
| DELAY 7T | 1 | 1 | 1 | 0 | 1 | 0 | 0 | 7 - 0 = 7 |

FIG.22

| M-SEQUENCE PN CODE | | | 1 | 1 | 1 | 0 | 1 | 0 | 0 | | MATCH: MISMATCH: INDETERMINATE |
|---|---|---|---|---|---|---|---|---|---|---|---|
| DELAY DIFFERENCE −3T | 1 | 1 | 0 | 1 | 0 | 0 | 0 | ? | ? | ? | 2:2:3 |
| DELAY DIFFERENCE −2T | ? | 1 | 1 | 0 | 1 | 0 | 1 | 0 | ? | ? | 3:2:2 |
| DELAY DIFFERENCE −1T | ? | ? | 1 | 1 | 0 | 1 | 0 | 0 | 0 | ? | 3:3:1 |
| DELAY DIFFERENCE ±0T | ? | ? | ? | 1 | 1 | 1 | 0 | 1 | 0 | 0 | 7:0:0 |
| DELAY DIFFERENCE +1T | ? | ? | ? | ? | 1 | 1 | 1 | 0 | 1 | 0 | 3:3:1 |
| DELAY DIFFERENCE +2T | ? | ? | ? | ? | ? | 1 | 1 | 1 | 0 | 1 | 3:2:2 |
| DELAY DIFFERENCE +3T | ? | ? | ? | ? | ? | ? | 1 | 1 | 1 | 0 | 2:2:3 |

DETECTION SECTION (CORRELATION PERIOD)

FIG.24

| M-SEQUENCE PN CODE | | | 1 | 1 | 1 | 0 | 1 | 0 | 0 | | | | MATCH:MISMATCH:INDETERMINATE |
|---|---|---|---|---|---|---|---|---|---|---|---|---|---|
| DELAY DIFFERENCE −3T | 1 | 1 | 1 | 1 | 1 | 0 | 1 | 0 | 0 | ? | ? | ? | 3:4:0 |
| DELAY DIFFERENCE −2T | 0 | 1 | 1 | 1 | 0 | 1 | 0 | 0 | 1 | ? | ? | ? | 3:4:0 |
| DELAY DIFFERENCE −1T | 0 | 0 | 1 | 0 | 1 | 0 | 0 | 1 | 1 | 1 | ? | ? | 3:4:0 |
| DELAY DIFFERENCE ±0T | 1 | 0 | 0 | 1 | 0 | 1 | 1 | 1 | 0 | 1 | 1 | ? | 7:0:0 |
| DELAY DIFFERENCE +1T | ? | 1 | 1 | 0 | 1 | 1 | 1 | 0 | 1 | 0 | 1 | 1 | 3:4:0 |
| DELAY DIFFERENCE +2T | ? | ? | 1 | 1 | 1 | 0 | 1 | 0 | 0 | 1 | 0 | 1 | 3:4:0 |
| DELAY DIFFERENCE +3T | ? | ? | ? | 1 | 1 | 0 | 0 | 1 | 0 | 1 | 1 | 0 | 3:4:0 |

DETECTION SECTION (CORRELATION PERIOD)

DRIVING SUPPORT APPARATUS

CROSS-REFERENCE TO RELATED APPLICATIONS

This application is based upon and claims the benefit of priority from Japanese Patent Application No. 2018-206949, filed Nov. 1, 2018, the entire contents of which are incorporated herein by reference.

FIELD

The present disclosure relates to a driving support apparatus.

BACKGROUND

Concerning vehicles, there is known a technique of detecting an obstacle on a route by using a sound wave sensor and controlling a vehicle based on a detection result. There is also known a technique of temporarily increasing, based on a captured image, sensitivity of object detection performed by the sound wave sensor when it is determined that the vehicle is approaching a predetermined object which is difficult to be detected with reflected waves by the sound wave sensor. Conventional technologies are described in Japanese Patent Application Laid-open No. 2018-081050, for example.

However, in a case of detecting a person with sound waves, strength of echoes reflected by the person becomes weak since persons have low reflectivity to the sound waves. In particular, sound of rain at the time of rainfall or running sound of a tire becomes background noise. In such cases, when the background noise becomes larger than the echoes, the background noise cannot be distinguished from the echoes even if sensitivity is increased. As a result, the echoes cannot be detected. Thus, there is a need for a technique of detecting a person who exists around a vehicle even in a situation where there is noise.

SUMMARY

A driving support apparatus according to the present disclosure includes a sound wave sensor control unit. The sound wave sensor control unit is configured to select, as a transmission and reception scheme, either a pulse scheme or a spread spectrum modulation scheme, and to control a sound wave sensor with the selected transmission and reception scheme. When the spread spectrum modulation scheme is selected as the transmission and reception scheme, the sound wave sensor control unit causes the sound wave sensor to successively transmit and receive sound waves by using the spread spectrum modulation scheme.

BRIEF DESCRIPTION OF THE DRAWINGS

FIG. 21 is a diagram illustrating an example of a matching degree of a phase based on an input timing of a received signal with respect to a demodulation timing using a PN code:

FIG. 22 is a diagram for explaining a problem in a case of transmitting a PN code corresponding to one cycle:

FIG. 24 is a diagram illustrating an example of a timing of demodulation and reception of a received signal in a case of using a PN code according to the second embodiment:

DETAILED DESCRIPTION

The following describes embodiments of a driving support apparatus according to the present disclosure with reference to the drawings.

First Embodiment

In a first embodiment, a specific obstacle candidate, which represents possibility that there is a specific obstacle, is detected from environment information in a predetermined direction around a vehicle. The environment information is acquired by using electromagnetic waves. Upon the specific obstacle candidate is detected, sound waves, which have been modulated by a spread spectrum modulation scheme (spread spectrum modulation scheme), are transmitted, and echoes reflected by the specific obstacle candidate are observed to check whether the specific obstacle is present at an estimated position. The specific obstacle is an obstacle to which the vehicle should not approach when presence of the obstacle is confirmed in a traveling direction of the vehicle. The specific obstacle may be a pedestrian, an infant, a wheelchair or a baby buggy on which a person rides, or a movable object that has low reflectivity to sound waves and needs to be protected. The environment information in the predetermined direction of the vehicle acquired by using electromagnetic waves may be image data of a vehicle rear side that is photographed by an imaging device, that is, a camera.

Figure 1:
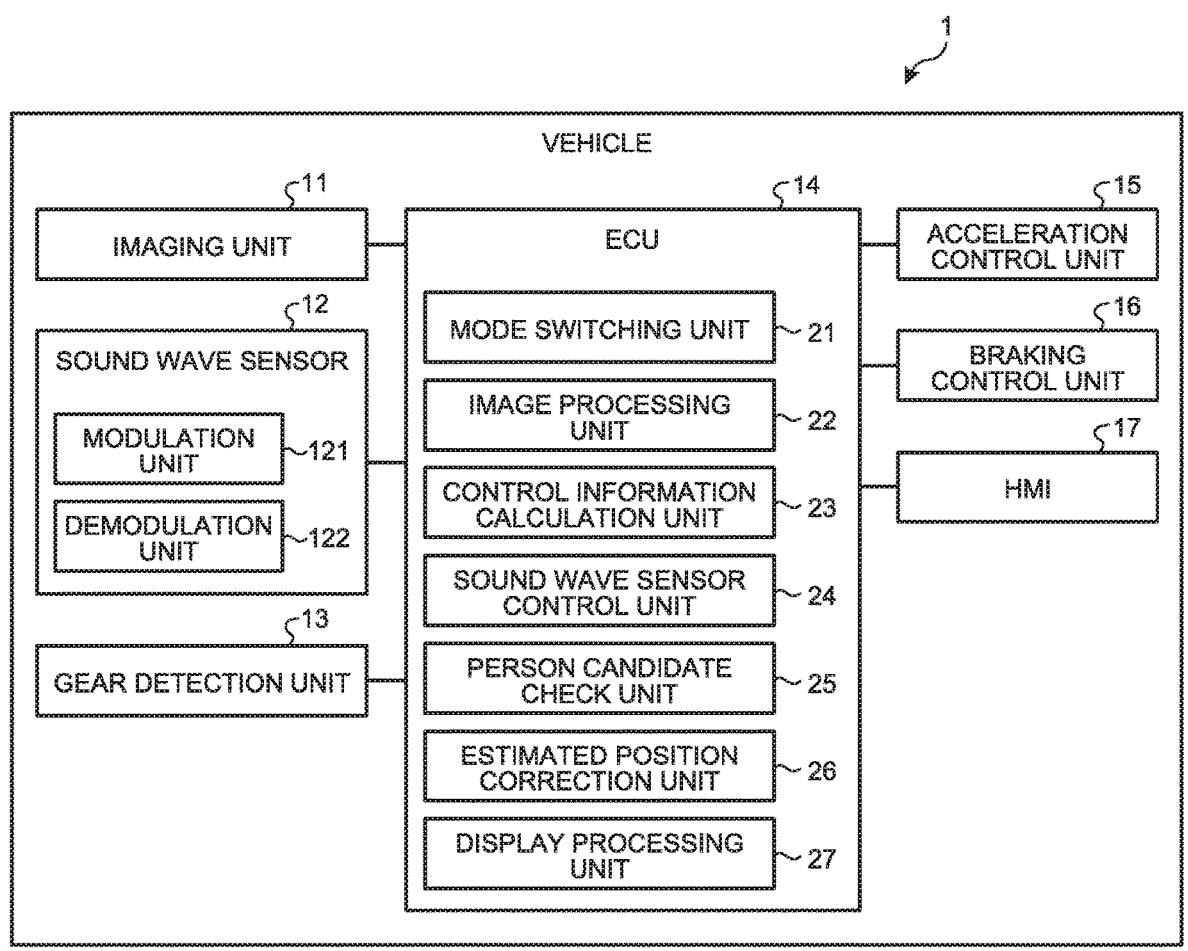
FIG. 1 is a block diagram schematically illustrating a configuration example of a vehicle including a driving support apparatus according to a first embodiment.
Figure 2A:
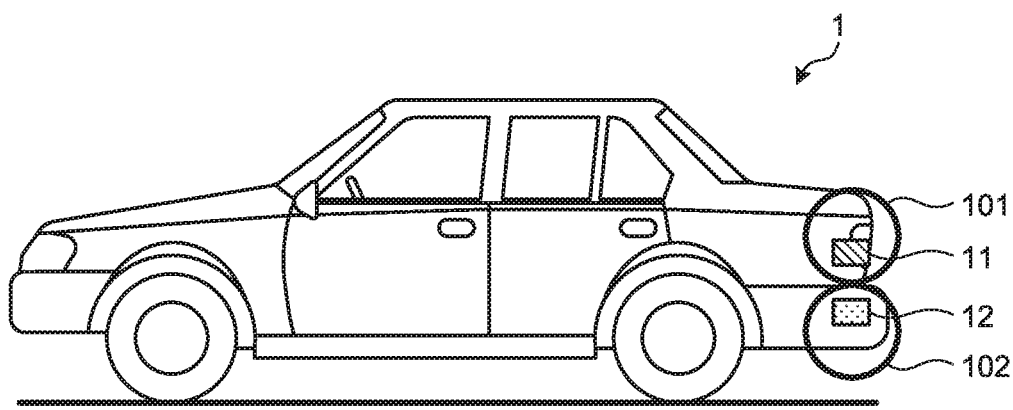
FIG. 2A is a side view schematically illustrating an example of the vehicle according to the first embodiment.
Figure 2B:
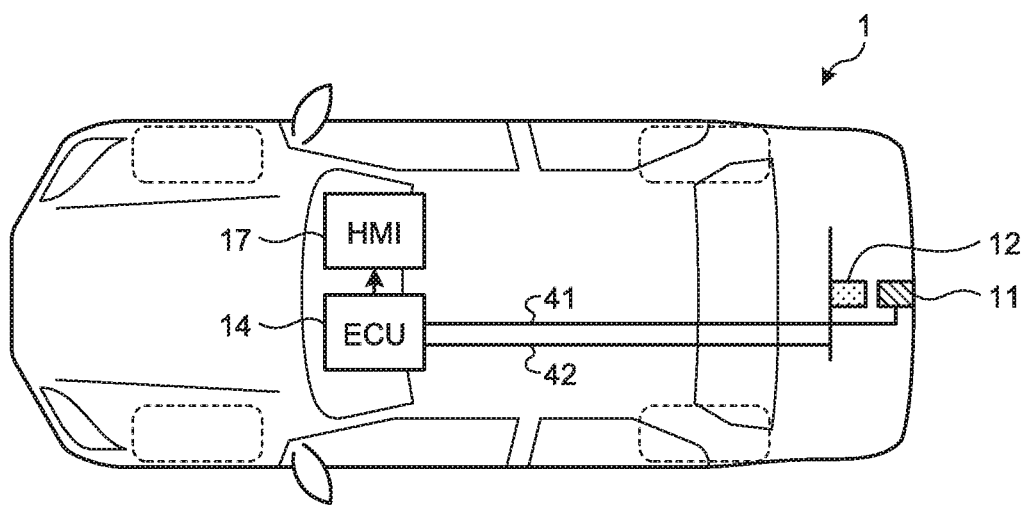
FIG. 2B is a top view schematically illustrating an example of the vehicle according to the first embodiment.

FIG. 1 is a block diagram schematically illustrating a configuration example of a vehicle including a driving support apparatus according to the first embodiment. FIG. 2A and FIG. 2B are diagrams schematically illustrating an example of the vehicle according to the first embodiment, FIG. 2A is a side view, while FIG. 2B is a top view. The driving support apparatus is an apparatus that is provided in a vehicle 1, and that detects the specific obstacle candidate present on a traveling direction side of the vehicle 1 from an image of the vehicle rear side photographed by the camera. When the specific obstacle candidate is detected, the driving support apparatus calculates an estimated position of a specific obstacle candidate and determines whether the specific obstacle candidate is present at the estimated position by using sound waves. Examples of the vehicle 1 include an automobile, a motorcycle, and a train.

The vehicle 1 includes an imaging unit 11 serving as an environment information acquisition unit, a sound wave sensor 12, a gear detection unit 13, an electronic control unit (ECU) 14, an acceleration control unit 15, a braking control unit 16, and a human-machine interface (HMI) 17.

The imaging unit 11 outputs, to the ECU 14, image data as environment information obtained by photographing a predetermined range around the vehicle 1. As illustrated in FIG. 2A and FIG. 2B, the imaging unit 11 is disposed on a rear part of the vehicle 1, for example, on a trunk panel 101. Thus, the predetermined range spreads at the rear of the vehicle 1. The imaging unit 11 is connected to the ECU 14 via a communication line 41 such as an FPD-Link.

The sound wave sensor 12 transmits the sound waves as transmitted signals, and receives, as received signals, returned echoes that are the sound waves reflected by an object located outside of the vehicle 1. The sound wave sensor 12 transmits pulse-like sound waves (hereinafter, also referred to as pulse waves) or continuous sound waves (hereinafter, also referred to as continuous waves) depending on a mode. A sound wave sensor, in which an oscillator is used for both transmission and reception, can be adopted as the sound wave sensor 12. In the sound wave sensor 12 of this case, a transmission period and a reception period are switched. As illustrated in FIGS. 2A and 2B, the sound wave sensor 12 is disposed near the center in a width direction of a rear bumper 102 of the vehicle 1. Exemplified is a case in which one sound wave sensor 12 is provided. The sound wave sensor 12 is connected to the ECU 14 via a network 42 such as a local area network (LAN) or a controller area network (CAN). As the sound wave sensor 12, sonar and the like can be used.

Figure 3A:
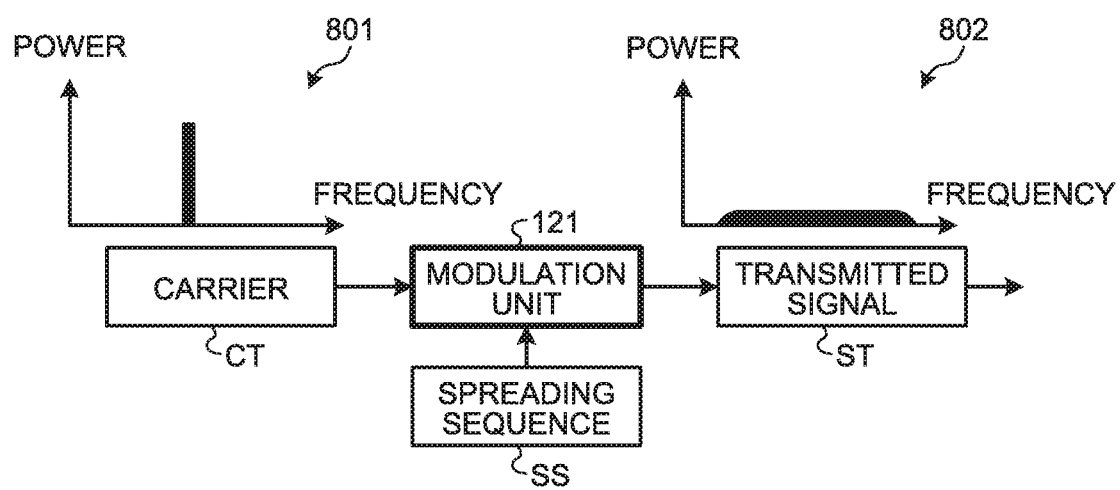
FIG. 3A is a diagram schematically illustrating a function of a modulation unit.
Figure 3B:
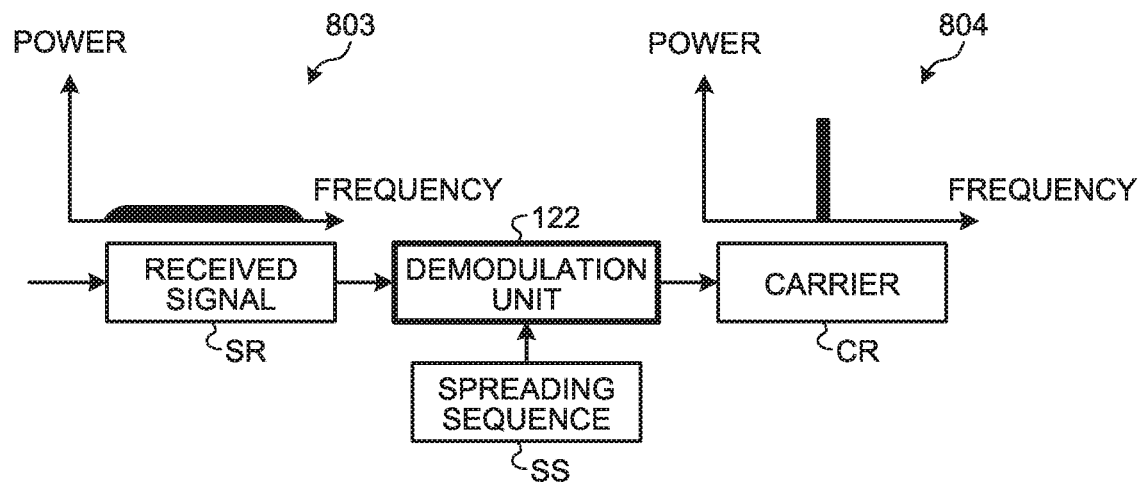
FIG. 3B is a diagram schematically illustrating a function of a demodulation unit.

The sound wave sensor 12 includes a modulation unit 121 and a demodulation unit 122. FIG. 3A is a diagram schematically illustrating a function of the modulation unit, and FIG. 3B is a diagram schematically illustrating a function of the demodulation unit. As illustrated in FIG. 3A, by means of spread spectrum modulation using a spreading sequence SS, the modulation unit 121 generates a transmitted signal ST as a signal obtained by performing spread spectrum modulation on a carrier CT having a single frequency. Specifically, the carrier CT, in which power density is concentrated on a single frequency as shown in a graph 801, is modulated with the spreading sequence SS to be the transmitted signal ST in which power density is distributed to frequencies in a wide range as represented in a graph 802.

As illustrated in FIG. 3B, the demodulation unit 122 restores a received signal SR, which has been obtained by the spread spectrum modulation, to be a carrier CR having a single frequency by demodulation using the spreading sequence SS. Specifically, when the received signal SR, in which power density is distributed to frequencies in a wide range, is demodulated with the spreading sequence SS as represented in a graph 803, the carrier CR, in which power density is concentrated on a single frequency as represented in a graph 804, is obtained.

The spread spectrum modulation includes a direct spread scheme, a linear frequency modulation scheme, and a frequency hopping scheme. The direct spread scheme is also called a pseudo random carrier modulation scheme or a coded modulation scheme. In the following description, the direct spread scheme is referred to as a direct-sequence spread spectrum modulation scheme since a PN code (Pseudo Noise code) is used. The linear frequency modulation scheme is also called a chirp modulation scheme.

Figure 4A:
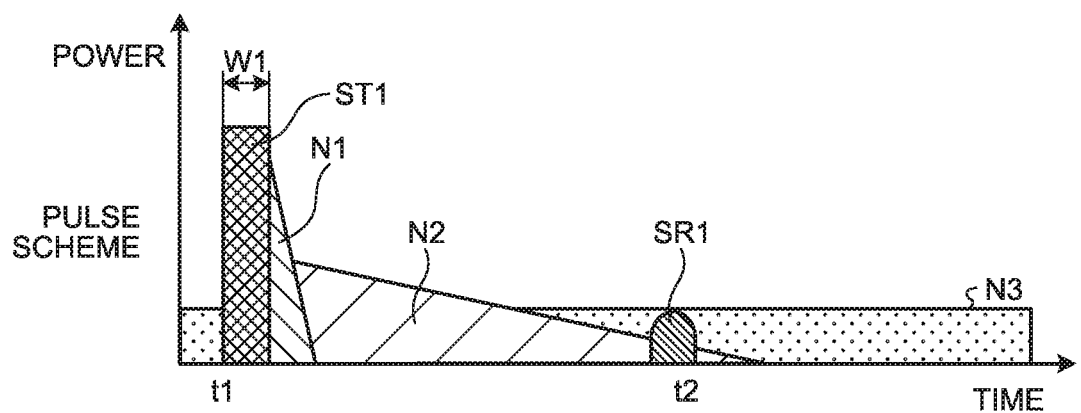
FIG. 4A is a diagram schematically illustrating an example of temporal change in a pulse-like transmitted signal and a pulse-like received signal in a case of transmitting and receiving a signal using a pulse scheme.
Figure 4B:
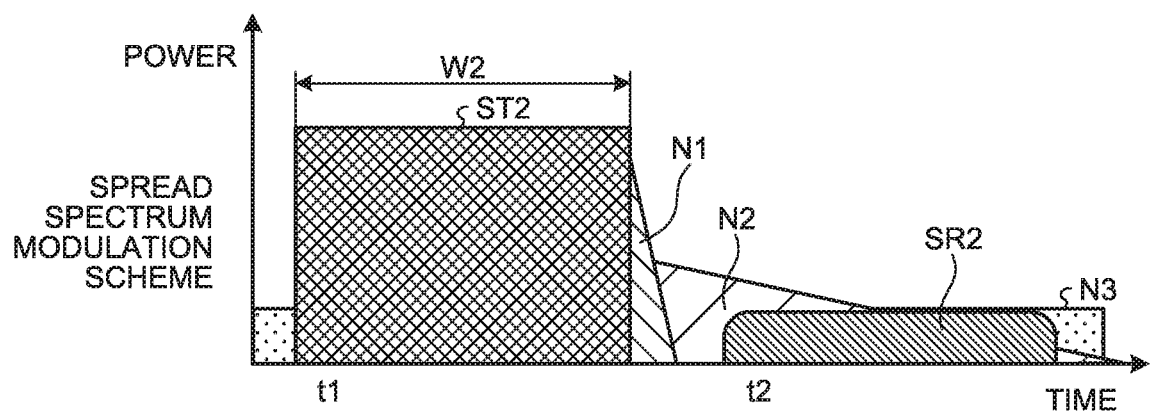
FIG. 4B is a diagram schematically illustrating an example of temporal change in the transmitted signal and the received signal in a case of transmitting and receiving signals by spread spectrum modulation.

FIG. 4A and FIG. 4B are diagrams schematically illustrating an example of temporal change in the transmitted signal and the received signal. FIG. 4A illustrates a case of transmitting and receiving a signal using a pulse scheme, while FIG. 4B illustrates a case of transmitting and receiving a signal by spread spectrum modulation. In those drawings, a horizontal axis indicates time, and a vertical axis indicates electric power. As illustrated in the drawings, a transmission period is short in the pulse scheme (FIG. 4A), while the transmission period is long in the spread spectrum modulation scheme (FIG. 4B). It is assumed here that transmitted signals ST1 and ST2 are transmitted from the sound wave sensor 12 at a time t1, and the transmitted signals ST1 and ST2 reflected by a specific obstacle candidate are received by the sound wave sensor 12 as received signals SR1 and SR2 at a time t2. In a case of detecting a person or an object with sound waves, interference and noise are always present. Examples of interference include reverberation N1 of sound wave transmission and a reflected wave N2 of a sound wave from a road surface, and examples of noise include background noise N3. The reverberation N1 of sound wave transmission is attenuated in accordance with elapsed time. The reflected wave N2 from the road surface is proportional to transmission power and is reduced in accordance with a distance from the road surface. The background noise N3 is present irrespective of the transmission power, the distance, and the time.

In a case of the pulse scheme in FIG. 4A, a pulse width W1 as a transmission time for the pulse-like transmitted signal ST1 is very short, so that a power product of the transmitted signal ST1 as a product of the transmission power and the transmission time is small. That is, a total quantity of energy to be transmitted is small. Accordingly, the power product of the received signal SR1 becomes small. An amplitude of the received signal SR1 is reduced in inversely proportion to the square of the distance, so that the received signal SR1 is buried in the noise as described above in some cases. Thus, it becomes difficult to detect the received signal SR1.

On the other hand, as illustrated in FIG. 4B, in a case of performing spread spectrum modulation, a transmission period W2 of the transmitted signal ST2 is significantly larger than the pulse width W1, so that the power product of the transmitted signal ST2 becomes large. That is, the total quantity of energy to be transmitted is large. Accordingly, the power product of the received signal SR2 becomes large as compared with the case of FIG. 4A. Among noises, the reflected wave N2 from the road surface can be separated because a distance, that is, a phase is different, and the background noise N3 can be suppressed by being integrated for a long time with a correlator. Thus, even when a level of the received signal SR2 is equal to or lower than a noise level in an envelope waveform, the distance to the specific obstacle candidate can be specified.

Figure 5A:
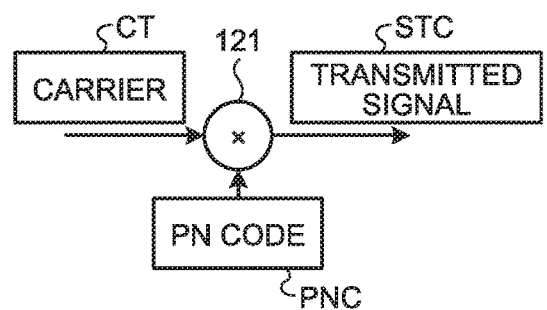
FIG. 5A is a diagram illustrating a configuration example of the modulation unit in a case of using a direct-sequence spread spectrum modulation scheme.
Figure 5B:
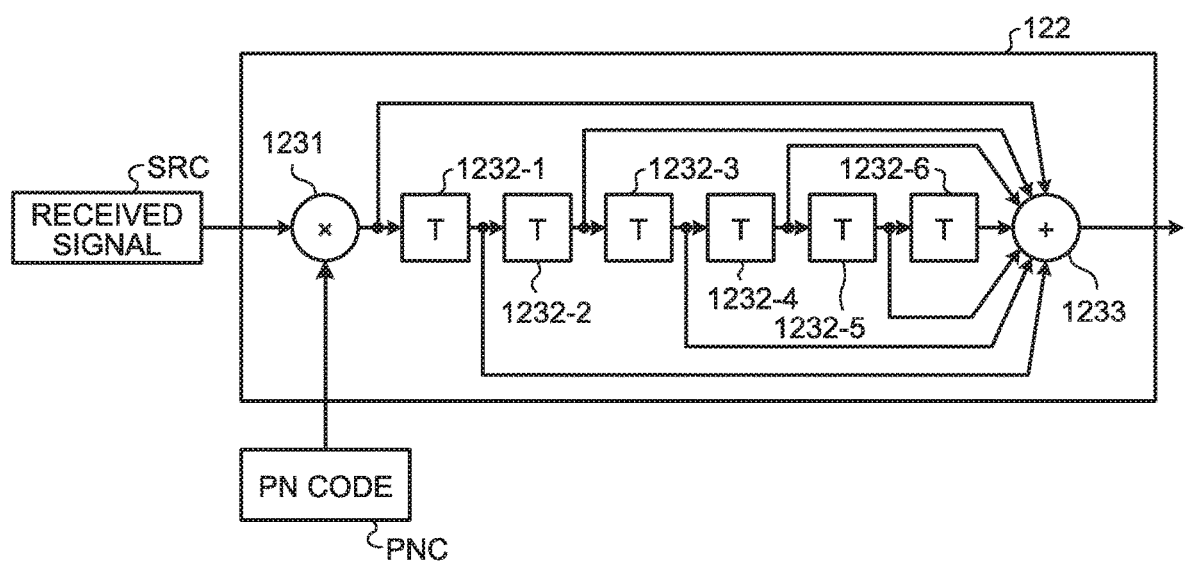
FIG. 5B is a diagram illustrating a configuration example of the demodulation unit in a case of using a direct-sequence spread spectrum modulation scheme.

The following describes a case of modulating and demodulating sound waves using the direct-sequence spread spectrum modulation scheme as the spread spectrum modulation scheme. As a pseudo-random code used in the direct-sequence spread spectrum modulation scheme, there are known a Maximum-Length (M)-sequence code, a Barker code, a Gold code, and the like. FIG. 5A is a diagram illustrating a configuration example of the modulation unit in a case of using the direct-sequence spread spectrum modulation scheme. FIG. 5B is a diagram illustrating a configuration example of the demodulation unit in a case of using the direct-sequence spread spectrum modulation scheme.

As illustrated in FIG. 5A, the modulation unit 121 is constituted of a multiplier that modulates the carrier CT with an n-bit (n is an integral number equal to or larger than 1) PN code PNC to be a transmitted signal STC in a case of a person checking mode (described later). Specifically, in units of a bit cycle of the PN code PNC, the modulation unit 121 maintains a phase of the carrier CT when the PN code PNC is 1, and reverses the phase of the carrier CT when the PN code PNC is 0. In a carrier having a single frequency, power density is spread to a bandwidth proportional to a bit rate of the PN code due to PN code modulation.

Figure 6A:
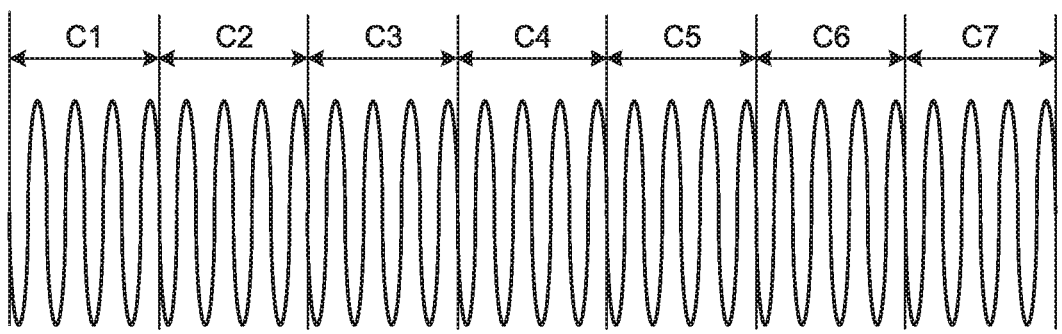
FIG. 6A is a diagram illustrating an example of a carrier that is not modulated with a PN code.
Figure 6B:
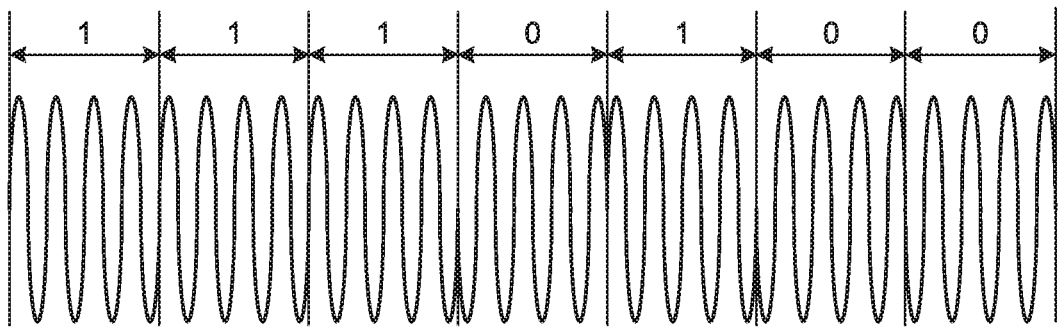
FIG. 6B is a diagram illustrating an example of a transmitted signal modulated with a PN code.

FIG. 6A and FIG. 6B are diagrams illustrating an example of modulation or demodulation of the carrier using the PN code. FIG. 6A is a diagram illustrating an example of the carrier that is not modulated with the PN code. FIG. 6B is a diagram illustrating an example of the transmitted signal modulated with the PN code. Exemplified herein is a case in which the carrier is code-modulated by using a 7-bit PN code "1110100". In this example, modulation or demodulation is performed in units of the 7-bit PN code "1110100", so that this unit is referred to as a cycle of a spreading sequence or a spreading sequence length.

When code modulation is performed on the carrier illustrated in FIG. 6A by using the 7-bit PN code, the transmitted signal STC is caused to have a waveform as illustrated in FIG. 6B. In those cases, the left side of the drawing represents a wave that has been transmitted earlier. As illustrated in FIG. 6A, when the carrier is partitioned in units of a bit cycle T of the PN code, the carrier contains components C1 to C7. As illustrated in FIG. 6B, when the carrier is modulated by using the PN code of "110100", the phase is reversed in the components C4, C6, and C7, and the phase is maintained as it is in the other components C1 to C3 and C5. The transmitted signal STC containing the components C1 to C7 illustrated in FIG. 6B is transmitted from the sound wave sensor 12.

At a timing when the received signal SRC reflected by the specific obstacle candidate is received by the sound wave sensor 12, the demodulation unit 122 demodulates the received signal SRC by using the PN code PNC. As illustrated in FIG. 5B, the demodulation unit 122 is constituted of a correlator and includes a multiplier 1231, n−1 (n is an integral number equal to or larger than 1) delay units 1232, and an adder 1233. The multiplier 1231 multiplies the received signal SRC by the PN code PNC and outputs the carrier having a single frequency to the delay unit 1232 and the adder 1233 at a subsequent stage. The delay unit 1232 outputs the demodulated carrier with a delay corresponding to the bit cycle T of the PN code PNC. The n−1 delay units 1232 are connected in series between the multiplier 1231 and the adder 1233. An output side of each of the delay units 1232 is also connected to the adder 1233. The adder 1233 adds up outputs from the multiplier 1231 and the n−1 delay units 1232.

Specifically, in units of the bit cycle T of the PN code PNC, the demodulation unit 122 maintains the phase of the received signal SRC when the PN code PNC is 1, and reverses the phase of the received signal SRC when the PN code PNC is 0. The PN code PNC is input to the multiplier 1231 at a timing of receiving the received signal SRC.

When the PN-modulated transmitted signal illustrated in FIG. 6B is reflected by the specific obstacle candidate and arrives at the sound wave sensor 12, the received signal is also caused to have the waveform illustrated in FIG. 6B. However, noise has been added to the received signal. When this received signal is demodulated by using the PN code of "1110100", the phase is reversed in the components C4, C6, and C7, and the phase is maintained as it is in the other components C1 to C3 and C5. That is, as illustrated in FIG. 6A, the code disappears and a continuous wave appears.

The following describes an outline of an operation performed by the demodulation unit 122 with reference to FIG. 5B. It is assumed that the received signal SRC as illustrated in FIG. 6B is input to the demodulation unit 122. When the received signal SRC is demodulated at a timing when the PN code PNC is transmitted from a sound wave sensor control unit 24 (described later), the phase is reversed in the components C4, C6, and C7, and the phase is maintained in the other components. The demodulated carrier is then output to the delay unit 1232 relating to the PN code PNC. It is assumed that no signal has been received before the carrier illustrated in FIG. 6B is received.

Each of delay units 1232-1 to 1232-6 outputs the carrier while shifting a timing corresponding to the bit cycle T of the PN code PNC. That is, when a component Ci (i is an integral number equal to or larger than 1 and equal to or smaller than n) of the received signal is input to the delay units 1232-1 to 1232-6, the component C1 that is delayed by the bit cycle T is output to the delay units 1232-2 to 1232-6 at a subsequent stage or the adder 1233. The multiplier 1231 and the delay units 1232-1 to 1232-5 also output the component C1 to the adder 1233 when outputting the component C1 to the delay unit 1232 at a subsequent stage.

The adder 1233 adds up outputs from the delay units 1232-1 to 1232-6 and the multiplier 1231. That is, the adder 1233 adds up waves of the components C1 to C7 output from the delay units 1232-1 to 1232-6 and the multiplier 1231. The components C1 to C6 are output to the adder 1233 from the delay units 1232-6 to 1232-1 in a state where the components C1 to C6 are individually input to the delay units 1232-6 to 1232-1 and at a timing when the component C7 is output from the multiplier 1231. Thus, the waves of the components C1 to C7 are added up by the adder 1233, and a waveform having large output amplitude is obtained. That is, carrier signals corresponding to one cycle of the PN code PNC that are added up in an enhanced manner are output from the adder 1233, and the amplitude becomes seven times the amplitude before the addition. On the other hand, the frequency and the phase of the noise contained in the received signal are random, and the carrier signals may be enhanced each other or cancel out each other in some cases, so that the amplitude is suppressed as compared with carrier signals that are always enhanced each other. Typically, in a case in which the noise is uncorrelated random noise, the amplitude is increased by $\sqrt{n}$ times due to n-steps of addition. Thus, the amplitude of the random noise output from the adder 1233 is increased by $\sqrt{7}$ times in this example. Based on the carrier signal that is increased by seven (7) times by addition, the amplitude of the random noise becomes $1/\sqrt{7}$ times thereof, so that it can be said that modulation gain (noise suppression ratio) that enhances an S/N ratio is obtained. In this description, a code length is assumed to be n=7, but larger modulation gain can be obtained as the code length is longer. Thus, the code length of the PN code that is actually used often ranges from several tens of bits to several hundreds of bits. On the other hand, in a case in which a timing when the received signal SRC arrives at the sound wave sensor 12 shifts from a timing of demodulation with the PN code PNC, the PN code PNC of the received signal SRC does not disappear and power density is kept being spread, so that a signal having a large amplitude cannot be obtained. In the pulse scheme, a time point at which amplitude of a received pulse exceeds a threshold is notified to the ECU 14 as reception time of the received signal. However, in the spread spectrum modulation scheme, an output amplitude reaches a peak when the waves of the signal components C1 to C7 corresponding to one cycle fit into the correlator and are added up. The time until which the output of the correlator reaches the peak after receiving the signal increases as the code length is longer, so that some processing needs to be performed. Such processing may be processing of correcting the time based on the code length at the time when the sound wave sensor 12 notifies the ECU 14 of the reception time, or processing of correcting, by the ECU 14, the time when the time point at which the sound wave sensor 12 observed a peak value is notified.

While FIG. 5B illustrates a case in which the demodulation unit 122 is constituted of a digital filter, the embodiment is not limited thereto. For example, the demodulation unit 122 may be constituted of an analog filter.

Returning to FIG. 1, the description will be continued. The gear detection unit 13 determines whether a gear of the vehicle 1 is switched to a predetermined gear position. When the gear of the vehicle 1 is switched to a backward gear, or when the gear of the vehicle 1 is switched to another gear from the backward gear, the gear detection unit 13 outputs, to the ECU 14, a signal representing that the gear position has been changed.

The ECU 14 is a control unit that controls operation of the vehicle 1. In the present embodiment, the ECU 14 serves as a driving support apparatus. When a specific obstacle candidate is detected from the image data output by the imaging unit 11 while the vehicle 1 moves backward, the ECU 14 checks whether the specific obstacle candidate is present at an estimated position by using the sound wave sensor 12. When the specific obstacle candidate is present at the estimated position, the ECU 14 performs control of stopping the vehicle 1 or preventing the vehicle 1 from approaching the specific obstacle candidate any closer than a predetermined distance. The following exemplifies a case in which the specific obstacle is a person.

The ECU 14 includes a mode switching unit 21, an image processing unit 22 serving as a data processing unit, a control information calculation unit 23, a sound wave sensor control unit 24, a person candidate check unit 25 serving as a specific obstacle candidate check unit, an estimated position correction unit 26, and a display processing unit 27.

The mode switching unit 21 switches a control mode of the vehicle 1 among a forward movement mode, a backward movement mode, a person checking mode as a specific obstacle checking mode, and a backward movement restriction mode. A control mode of the sound wave sensor 12 is independent of the control mode of the vehicle 1, and is switched between a first mode using a normal pulse scheme as a transmission and reception scheme and a second mode using the spread spectrum modulation scheme as the transmission and reception scheme. The forward movement mode, which is one of control modes of the vehicle 1, is a mode in which the vehicle 1 is moving forward or is stopped. The forward moment mode is also a mode for detecting an object in the first mode as the pulse scheme using the sound wave sensor 12 without using the imaging unit 11. The backward movement mode is a mode for detecting an object in the first mode as the pulse scheme similarly to the forward movement mode with the sound wave sensor 12 while imaging the rear of the vehicle 1 by the imaging unit 11 at the time when the vehicle 1 is moving backward. The person checking mode is a mode for checking, when a person candidate as the specific obstacle candidate is detected from the image data taken by the imaging unit 11, whether a person is present at the estimated position of the person candidate by using the sound wave sensor 12. In the person checking mode, generally, the sound wave sensor 12 detects the person candidate using the spread spectrum modulation scheme instead of the pulse scheme, and checks whether a person is present at the estimated position of the person candidate. The backward movement restriction mode is a mode of restricting the operation of the vehicle 1 such that the vehicle 1 does not approach the person when it is confirmed that the person is present at the estimated position of the person candidate. The control mode of the sound wave sensor 12 is independent of the control mode of the vehicle 1. The sound wave sensor 12 performs control in the first mode as a mode for detecting the object using the pulse scheme in the forward movement mode and the backward movement mode, and performs control in the second mode using the spread spectrum modulation scheme generally in the person checking mode and the backward movement restriction mode, but may perform control in the first mode depending on a situation.

When the gear detection unit 13 detects that the gear is switched to the backward gear, the mode switching unit 21 switches the forward movement mode to the backward movement mode, and starts the imaging unit 11. When the image processing unit 22 detects the person candidate in the backward movement mode, the mode switching unit 21 switches the mode to the person checking mode. When the person candidate check unit 25 recognizes presence of the person candidate in the person checking mode, the mode switching unit 21 switches the mode to the backward movement restriction mode. In a case in which the gear detection unit 13 detects that the gear is switched to another gear from the backward gear, the mode switching unit 21 switches the mode to the forward movement mode from any of the backward movement mode, the person checking mode, and the backward movement restriction mode, and stops the imaging unit 11.

The image processing unit 22 includes an input unit that receives the image data from the imaging unit 11. The image processing unit 22 performs image processing that includes person candidate detection processing for detecting a person candidate that is assumed to stand with two legs from the image data taken by the imaging unit 11, and also includes estimated position calculation processing for calculating estimated position information of the person.

Figure 7A:
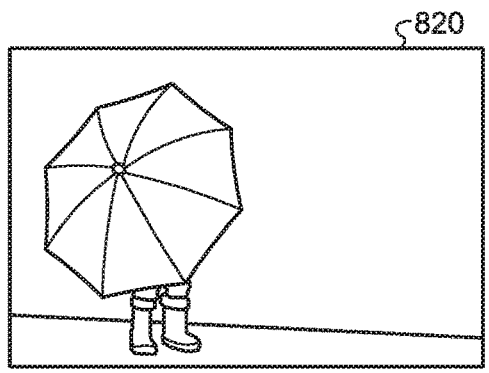
FIG. 7A is an example of image data.
Figure 7B:
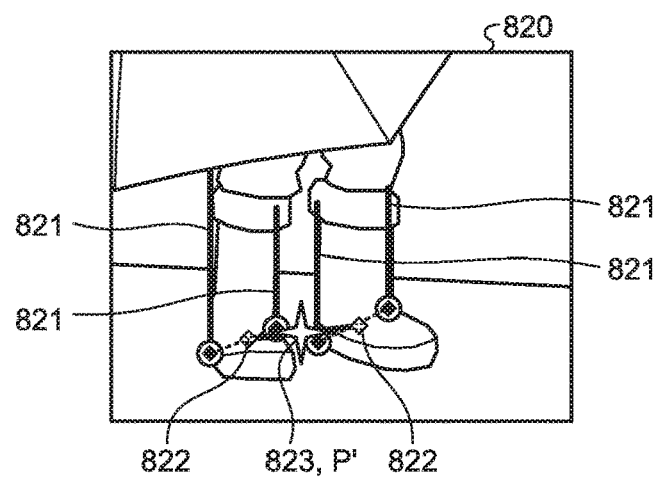
FIG. 7B is a diagram illustrating an example of a method of calculating an estimated position.
Figure 7C:
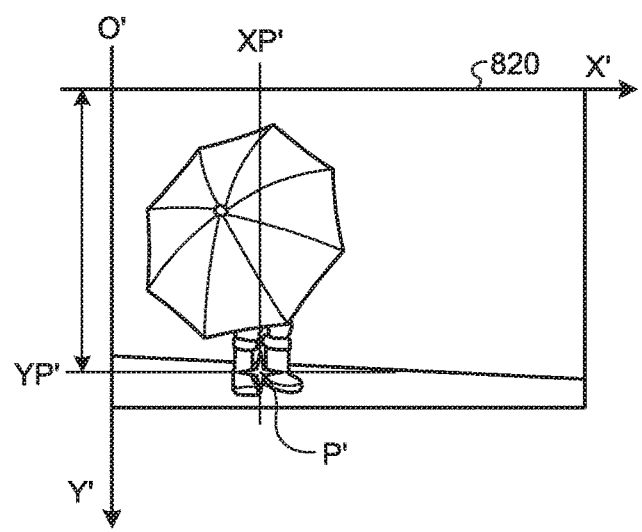
FIG. 7C is a diagram illustrating an example of an estimated position on the image data.

In the person candidate detection processing, the image processing unit 22 detects, as the person candidate, an object that stands with two legs from the image data taken by the imaging unit 11. FIG. 7A to FIG. 7C are diagrams illustrating an example of the image data taken by the imaging unit. FIG. 7A is an example of the image data. FIG. 7B is a diagram illustrating an example of a method of calculating the estimated position. FIG. 7C is a diagram illustrating an example of the estimated position on the image data.

Specifically, as illustrated in FIG. 7B, the image processing unit 22 performs edge detection on image data 820. The image processing unit 22 recognizes a pair of edges 821 in a vertical direction as legs. When those two legs are standing side by side, the image processing unit 22 detects the corresponding object as the person candidate. In detecting the edge 821 in the vertical direction, the edge 821 falling within a predetermined angle range around 90 degrees with respect to a horizontal direction may be recognized as the edge 821 in the vertical direction. In this way, when the object having two legs is detected as the person candidate, the person candidate can be correctly detected even in a case in which the entire silhouette thereof is greatly different from appearance of a normal person due to an umbrella, an overcoat, or a backpack. Erroneous detection of detecting an animal as the person candidate can be reduced. For example, as illustrated in FIG. 7A, even in a case of the image data 820 in which the person is holding an umbrella and a portion upper than his-her knees are hidden, the person can be detected as the person candidate because of the presence of the two legs. On the contrary, when the image includes a silhouette that appears to have two legs, it is detected as the person candidate. For example, two lines drawn on a road surface may be erroneously recognized as legs of a person.

This is a reason why the person cannot be determined only with the image, and check with the sound wave sensor is required.

In the estimated position calculation processing, the image processing unit 22 calculates the estimated position on the image data of the person candidate detected in the person candidate detection processing, and converts the estimated position into, for example, coordinates on a coordinate system provided on the vehicle 1. As illustrated in FIG. 7B, the image processing unit 22 obtains, for each of the legs, a middle point 822 between lower ends of the pair of edges 821 in the vertical direction that is recognized as a leg, and further obtains a middle point 823 between the two middle points 822 to be an estimated position P' on the image data. As illustrated in FIG. 7C, the estimated position P' on the image data is represented as (XP', YP') on a coordinate system in which an upper left corner part of the image data 820 is set as an origin O', a direction extending in a horizontal direction of the drawing is X'-axis, and a direction extending in a vertical direction is Y'-axis.

The image processing unit 22 also calculates a three-dimensional azimuth angle of the estimated position based on an installation position of the imaging unit 11 by using coordinates of the estimated position P' on the image data and information about an angle of view and a mounting angle of the imaging unit 11. The image processing unit 22 then converts the estimated position P' on the image data into the estimated position P on the road surface by using the three-dimensional azimuth angle. The three-dimensional azimuth angle can be expressed by using a depression angle and an azimuth angle within a horizontal plane. By using a well-known method, the three-dimensional azimuth angle of the estimated position of the person candidate can be obtained from the information about the angle of view and the mounting angle of the imaging unit 11. It is assumed that the estimated position P on the road surface is represented by a coordinate system having an origin at the position at which the imaging unit 11 of the vehicle 1 is installed.

Figure 8A:
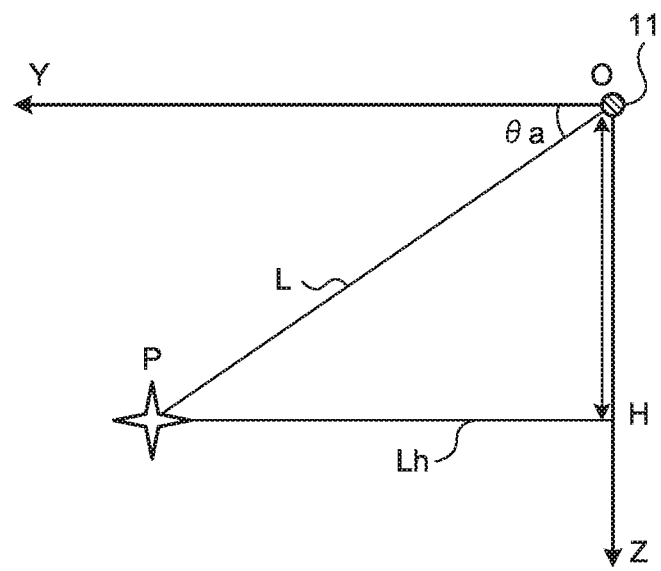
FIG. 8A is a diagram schematically illustrating a relation between an imaging unit and the estimated position in a vertical plane.
Figure 8B:
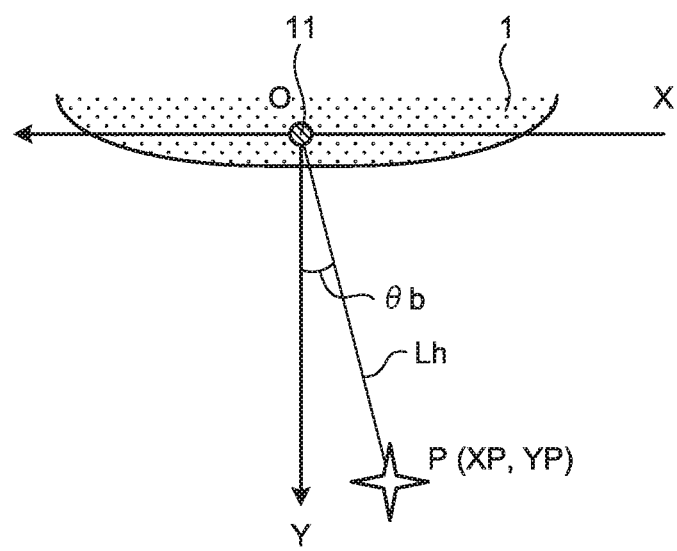
FIG. 8B is a diagram schematically illustrating a relation between the imaging unit and the estimated position in a horizontal plane.

FIG. 8A and FIG. 8B are diagrams schematically illustrating an example of a method of obtaining the estimated position on the road surface by using the three-dimensional azimuth angle. FIG. 8A is a diagram schematically illustrating a relation between the imaging unit and the estimated position in a vertical plane. FIG. 8B is a diagram schematically illustrating a relation between the imaging unit and the estimated position in a horizontal plane. The position of the imaging unit 11 installed in the vehicle 1 is assumed to be an origin O. An axis passing through the origin O and extending in a direction parallel with a length direction of the vehicle 1 in a plane parallel with the horizontal plane is assumed to be a Y-axis. An axis passing through the origin and being orthogonal to the Y-axis in a plane parallel with the horizontal plane is assumed to be an X-axis. An axis passing through the origin and being perpendicular to the X-axis and the Y-axis is assumed to be a Z-axis.

As illustrated in FIG. 8A, an angle made by the horizontal plane and a straight line L connecting the imaging unit 11 (origin O) with the estimated position P is assumed to be a depression angle $\theta a$. The depression angle $\theta a$ can be obtained from a vertical viewing angle of the imaging unit 11, a Y coordinate YP' of the estimated position P' on the image data, and the mounting angle of the imaging unit 11 in the vertical direction. A height H of the installation position of the imaging unit 11 from the road surface is known, so that a horizontal distance Lh between the imaging unit 11 and the estimated position P can be obtained by the following expression (1).

$$Lh = Hr/\tan \theta a \quad (1)$$

As illustrated in FIG. 8B, an angle made by the Y-axis and the straight line Lh connecting the imaging unit 11 (origin O) with the estimated position P in the horizontal plane is an azimuth angle $\theta b$ in the horizontal plane. The azimuth angle $\theta b$ can be obtained from a horizontal viewing angle of the imaging unit 11, an X coordinate XP' of the estimated position P' on the image data, and the mounting angle of the imaging unit 11 in the horizontal plane. The horizontal distance Lh between the imaging unit 11 and the estimated position P is obtained from the expression (1), so that coordinates (XP, YP) of the estimated position P in an XY-plane can be obtained from the horizontal distance Lh and the azimuth angle $\theta b$. That is, the coordinates of the estimated position P are represented by the following expression (2).

$$(XP, YP) = (Lh \cdot \sin \theta b, Lh \cdot \cos \theta b) \quad (2)$$

As described above, the coordinates (XP, YP) as the estimated position information of the person candidate on the road surface are obtained by the image processing unit 22. For the estimated position of the person candidate on the road surface, the Z coordinate is not considered.

Figure 9:
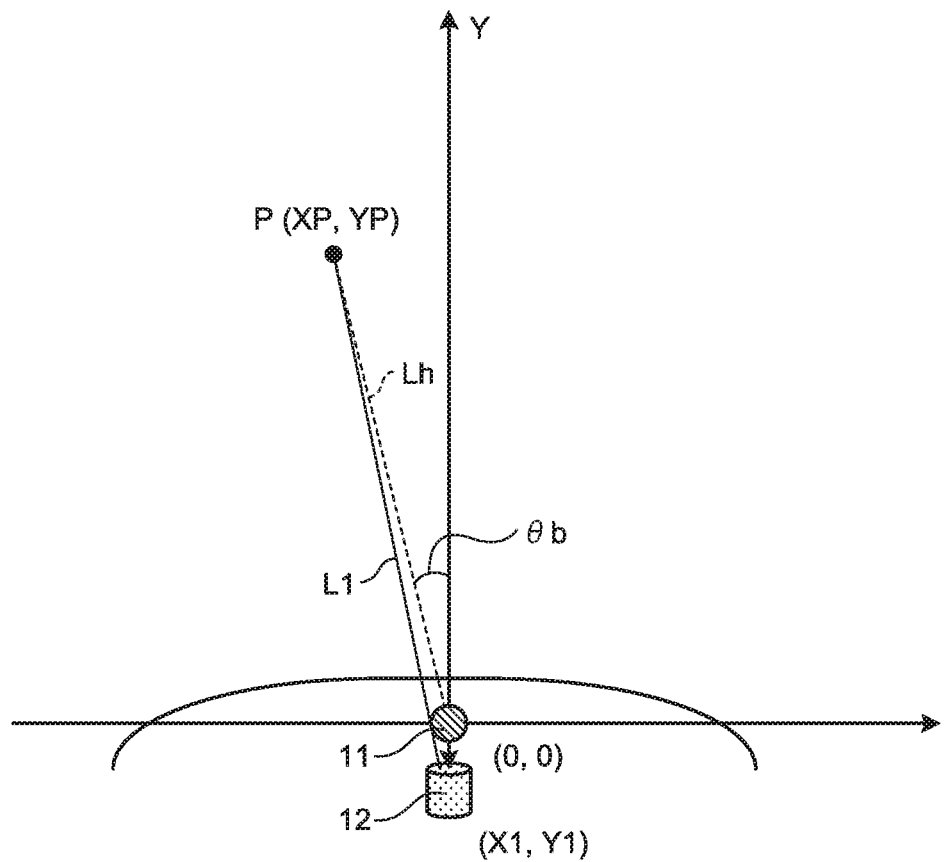
FIG. 9 is a diagram schematically illustrating a relation among the imaging unit, a sound wave sensor, and an estimated position of a person candidate.
Figure 10:
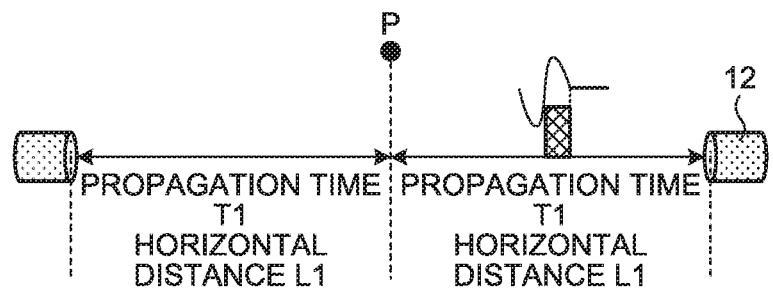
FIG. 10 is a diagram schematically illustrating a relation between propagation times during which sound waves transmitted from the sound wave sensor are reflected by the person candidate to be returned as echoes.

The control information calculation unit 23 calculates control information for controlling the sound wave sensor 12 by using the estimated position information of the person candidate from the image processing unit 22 or using corrected estimated position information of the person candidate from the estimated position correction unit 26 (described later). FIG. 9 is a diagram schematically illustrating a relation among the imaging unit, the sound wave sensor, and the estimated position of the person candidate. FIG. 10 is a diagram schematically illustrating a relation between propagation times during which the sound wave transmitted from the sound wave sensor is reflected by the person candidate to be returned as an echo.

First, the control information calculation unit 23 calculates a distance L1 between the sound wave sensor 12 and the estimated position P, and calculates the propagation time of the sound wave propagated between the sound wave sensor 12 and the estimated position P. As illustrated in FIG. 2B, in the vehicle 1, a positional relation between the imaging unit 11 and the sound wave sensor 12 is known in advance, so that the control information calculation unit 23 can calculate the distance L1 between the sound wave sensor 12 and the estimated position P on the coordinate system centered on the imaging unit 1*i*. For example, assuming that the coordinates of the sound wave sensor 12 are (X1, Y1), the distance L1 can be obtained by the following expression (3).

$$L1 = \{(XP - X1)^2 + (YP - Y1)^2\}^{1/2} \quad (3)$$

Subsequently, as illustrated in FIG. 10, the control information calculation unit 23 calculates an estimated propagation time T1 by the following expression (4) using the distance L between the sound wave sensor 12 and the estimated position P, and a known speed of the sound wave, that is, a sonic speed V.

$$T1 = L1/V \quad (4)$$

Accordingly, an estimated time of flight of the sound wave is calculated. The estimated time of flight indicates a time from when the sound wave is transmitted from the sound wave sensor 12 until the sound wave is reflected at the estimated position P to be returned. In FIG. 10, the estimated propagation time from the sound wave sensor 12 to the estimated position P is T1, so that the estimated time of flight is 2T1, which is twice the estimated propagation time T1. The control information calculation unit 23 gives, to the sound wave sensor control unit 24, control information including the estimated propagation time T1 of the sound wave sensor 12.

The sound wave sensor control unit 24 controls the operation of the sound wave sensor 12 based on the control mode of the vehicle 1. In the forward movement mode and the backward movement mode, the sound wave sensor control unit 24 controls the sound wave sensor 12 in the first mode, and the sound wave sensor 12 detects the object using the pulse scheme. In the person checking mode, the sound wave sensor control unit 24 generally controls the sound wave sensor 12 in the second mode, and controls a timing of modulating the carrier using the PN code and a timing of demodulating the received signal using the PN code based on the control information.

In the second mode, the sound wave sensor control unit 24 switches between the transmission period and the reception period of the sound wave sensor 12. The transmission period is set to be equal to or longer than one cycle of the spreading sequence and to be shorter than the estimated time of flight. This is because, in a case of the sound wave sensor 12 whose oscillator is used for both transmission and reception, the received signal cannot be received unless transmission of the transmitted signal is finished. That is, if the transmission period is longer than the estimated time of flight, a head part of the received signal as an echo reflected by the person candidate present at the estimated position cannot be received. By setting the transmission period to be equal to or longer than one cycle of the spreading sequence, modulation gain can be obtained through the spread spectrum modulation.

The sound wave sensor control unit 24 optimizes gain of an amplifier included in the sound wave sensor 12 based on the estimated time of flight. That is, the sound wave sensor control unit 24 optimizes the gain such that an output of the amplifier is not saturated in a time zone from when the transmitted signal is transmitted until the received signal is received. When a level of an amplifier output is inappropriate and is saturated or too low, the sound wave sensor control unit 24 corrects the gain.

Figure 11A:
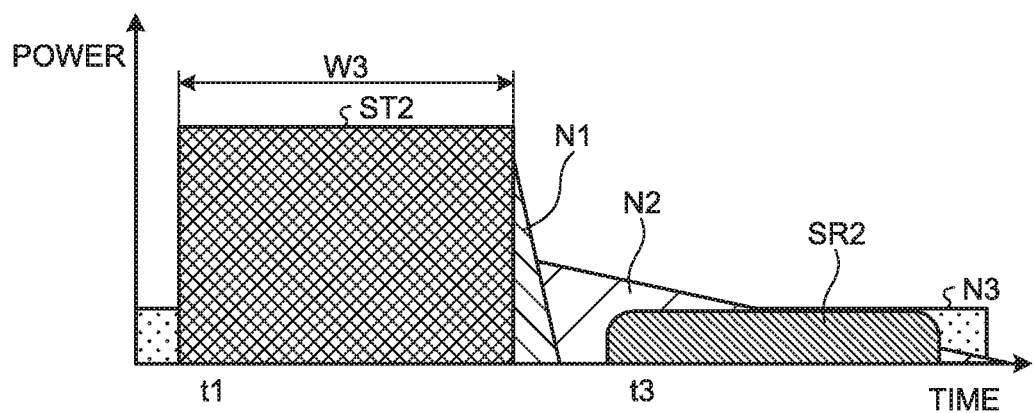
FIG. 11A is a diagram for explaining adjustment of a transmission period of a transmitted signal in a case in which spread spectrum modulation is performed and an estimated distance is long.
Figure 11B:
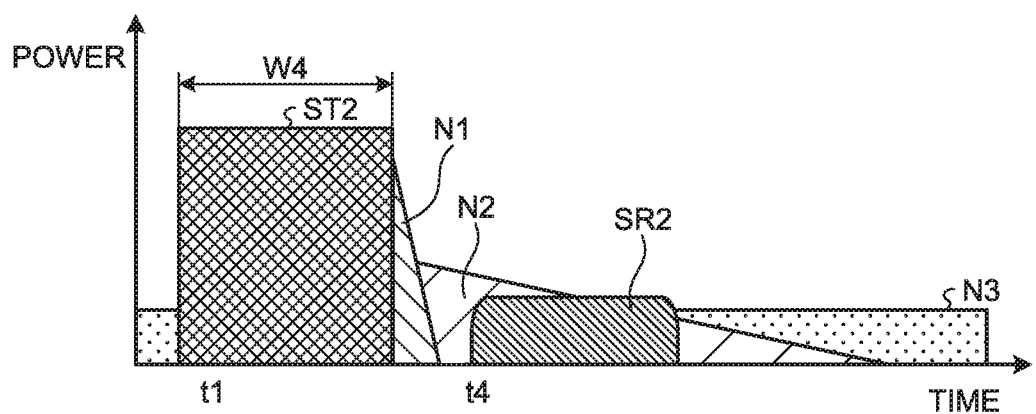
FIG. 11B is a diagram for explaining adjustment of the transmission period of the transmitted signal in a case in which spread spectrum modulation is performed and the estimated distance is short.

The timing of switching between the transmission period and the reception period can be changed depending on the estimated distance, which is a distance to the estimated position of the person candidate. FIG. 11A and FIG. 11B are diagrams for explaining adjustment of the transmission period of the transmitted signal in a case in which spread spectrum modulation is performed. FIG. 11A illustrates a case in which the estimated distance is long. FIG. 11B illustrates a case in which the estimated distance is short. In those drawings, a horizontal axis represents time, and a vertical axis represents electric power.

As illustrated in FIG. 11A, when the estimated distance to the person candidate is long, the distance to the person candidate can be specified by increasing a power product of the transmitted signal ST2 even if the level of the received signal SR2 is equal to or lower than the noise level in the envelope waveform. In this way, by increasing the cycle (code length) of the PN code, a transmission period W3 of the transmitted signal ST2 can be increased. Although the modulation gain becomes larger as the code length is increased, when the bit cycle of the PN code is the same, the time required for transmitting the PN code corresponding to one cycle becomes longer as the code length is longer.

As illustrated in FIG. 11B, when the estimated distance to the person candidate is short, the cycle of the PN code as a spreading sequence is shortened to be a transmission period W4 that is shorter than the transmission period W3 in a case of FIG. 11A. However, the reverberation N1 of transmission of the transmitted signal ST2 needs to be suppressed at the time of receiving the received signal SR2. Thus, the cycle of the PN code is adjusted such that the received signal SR2 is received at the time at which the reverberation N1 of transmission of the transmitted signal ST2 is suppressed. As a result, processing gain is reduced as compared with the case of FIG. 11A, but the sound wave is attenuated in inversely proportion to a square of the distance. Thus, as the distance is shorter, strength of the received signal SR2 is expected to be higher. That is, if the level of the received signal SR2 is high due to a short distance, the received signal SR2 can be detected with high possibility even if the processing gain is small. The length of the estimated distance to the person candidate may be a relative length, or may be a length of the estimated distance with respect to a certain reference value.

In this way, the spreading sequence length can be changed depending on the estimated distance to the person candidate. For example, as described above, the PN code having a long cycle is used when the estimated distance to the person candidate is long, and the PN code having a short cycle is used when the estimated distance to the person candidate is short.

Figure 12A:
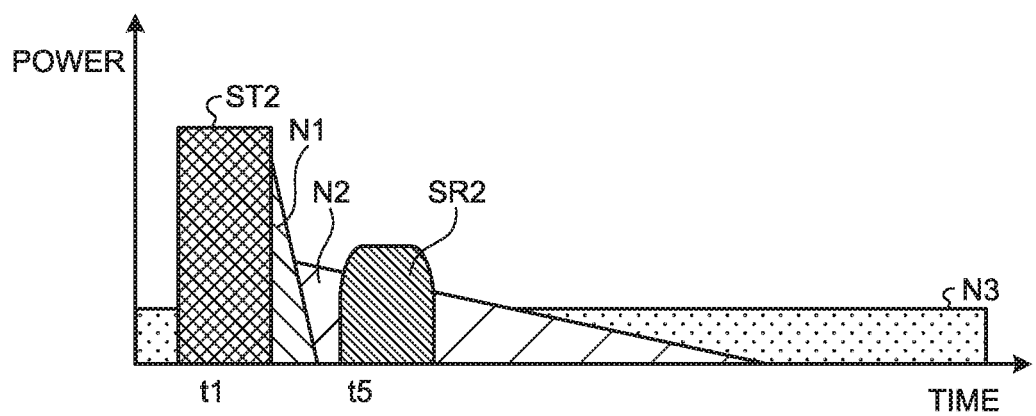
FIG. 12A is a diagram schematically illustrating an example of transmission and reception in a case in which the estimated distance to the person candidate is short and spread spectrum modulation is performed.
Figure 12B:
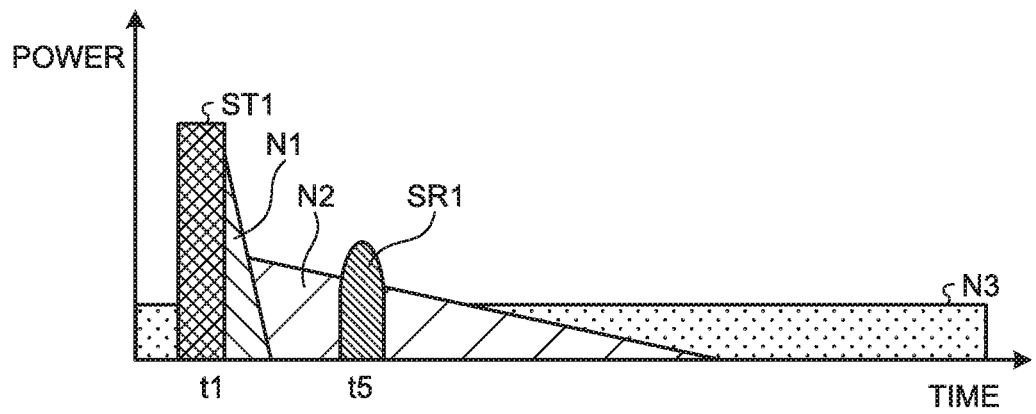
FIG. 12B is a diagram schematically illustrating an example of transmission and reception in a case in which the estimated distance to the person candidate is short and spread spectrum modulation is not performed.

FIG. 12A and FIG. 12B are diagrams schematically illustrating an example of transmission and reception of the signal in a case in which the estimated distance to the person candidate is short. FIG. 12A illustrates a case in which spread spectrum modulation is performed. FIG. 12B illustrates a case in which spread spectrum modulation is not performed. In these drawings, the horizontal axis indicates time, and the vertical axis indicates electric power. In this case, it is assumed that the transmitted signals ST1 and ST2 are transmitted from the sound wave sensor 12 at a time t1, and the received signals SR1 and SR2, which correspond to the transmitted signals ST1 and ST2 reflected by the person candidate, are received by the sound wave sensor 12 at a time t5.

As illustrated in FIG. 12A, in a case in which the estimated distance to the person candidate is shorter than that in the case of FIG. 11B, the cycle of the PN code becomes short, so that only low modulation gain can be obtained even when spread spectrum modulation is performed. However, in a case in which the person candidate is close to the sound wave sensor 12 in this way, as illustrated in FIG. 12B, it can be considered that the electric power of the received signal SR1 is often higher than the noise level. That is, there is a high probability that the received signal SR1 can be detected with the normal pulse scheme.

Thus, the sound wave sensor control unit 24 may select the spread spectrum modulation scheme when the estimated distance between the sound wave sensor 12 and the estimated position of the person candidate is larger than a predetermined distance. The sound wave sensor control unit 24 may continue to use the normal pulse scheme in a case in which the estimated distance between the sound wave sensor 12 and the estimated position of the person candidate is shorter than the predetermined distance to detect a person. The predetermined distance is a distance with which the level of the received signal is expected to be a value larger than the noise level. That is, even in the person checking mode, control may be performed in the first mode using the normal pulse scheme instead of the second mode using the spread spectrum modulation scheme, when the estimated distance to the person candidate is short.

In a case of applying this mode use, it is sufficient that the demodulation unit 122 can handle only a long spreading sequence length adapted to the distance longer than the predetermined distance. The sound wave sensor control unit 24 may select the pulse scheme in a case in which the distance to the estimated position of the person candidate is short, select the spread spectrum modulation scheme in which the spreading sequence length is short in a case in which the distance is intermediate, and select the spread spectrum modulation scheme in which the spreading sequence length is long in a case in which the distance is long. In this case, each of the short distance, the intermediate distance, and the long distance may be a relative distance, or may be a length of the estimated distance with respect to a certain reference value. The estimated distance to the person candidate shorter than a first reference value, for example, may be recognized as the short distance, the estimated distance longer than the first reference value and shorter than a second reference value may be recognized as the intermediate distance, and the estimated distance longer than the second reference value may be recognized as the long distance.

In this way, by changing the cycle of the PN code depending on the distance to the estimated position of the person candidate, processing gain corresponding to the distance to the estimated position of the person candidate can be obtained. Specifically, large processing gain can be obtained even when the person candidate is present at a distant place and the received signal is weak, so that the person candidate can be detected. Even when the person candidate is present at a short distance, the cycle of the PN code corresponding to the distance is selected, so that the person candidate can be detected.

In a case in which the estimated position of the person candidate is distant from the sound wave sensor 12 and background noise is a dominant interfering factor, the sound wave sensor control unit 24 may obtain a received signal having reception power larger than the background noise by increasing transmission power, more specifically, by causing the transmission power to be larger than the transmission power in the forward movement mode or the backward movement mode. At this point, the sound wave sensor control unit 24 may perform spread spectrum modulation after performing control for increasing the transmission power, or may perform control for increasing the transmission power of the pulse wave without performing spread spectrum modulation. As a result, more secure detection can be performed.

The sound wave sensor control unit 24 receives a result of measurement of a reception level before the transmitted signal is transmitted from the sound wave sensor 12. When the noise level is equal to or lower than a predetermined value, the sound wave sensor control unit 24 may transmit the pulse wave normally without performing spread spectrum modulation when the noise level is equal to or lower than the predetermined value. That is, the sound wave sensor control unit 24 may check the specific obstacle candidate in the first mode without switching the first mode for detecting the obstacle with pulse waves to the second mode for checking the specific obstacle candidate by performing spread spectrum modulation. In a case in which the noise level is equal to or smaller than the predetermined value, the received signal reflected by the person candidate can be received without performing spread spectrum modulation. Thus, the pulse scheme that can detect the obstacle at an indeterminate distance can be continuously used in the person checking mode instead of the spread spectrum modulation scheme that is used only for detecting the obstacle at a specific distance.

After transmitting the transmitted signal by the sound wave sensor 12, the sound wave sensor control unit 24 gives, to the person candidate check unit 25, a reception status of the received signal, which is the transmitted signal reflected by the person candidate. The reception status includes the received signal received by the sound wave sensor 12 and includes the time of flight of the sound wave (transmitted signal) from when the transmitted signal is transmitted by the sound wave sensor 12 until the received signal is received. In a case in which the received signal is not received within a period obtained by adding a predetermined permissible range to the estimated time of flight, it is assumed that the received signal is not received. The time of flight in this case becomes information indicating that the received signal is not received. In the present embodiment, while the single sound wave sensor 12 is provided, a plurality of sound wave sensors 12 can be adopted. By applying the time of flight from the sound wave sensors 12 arranged at a distance on the horizontal plane to trilateration, coordinates on the horizontal plane can be obviously specified. That is, when the plurality of sound wave sensors 12 are provided, a plurality of pieces of information about the time of flight are obtained, which are information that can specify the coordinates.

The person candidate check unit 25 evaluates reliability of person detection performed by the image processing unit 22 based on the reception status of the received signal in the sound wave sensor 12. Specifically, the person candidate check unit 25 compares the time of flight after the transmitted signal is transmitted by the sound wave sensor 12 with the estimated time of flight estimated based on the position of the person candidate. When a difference of them falls within a predetermined error range, the person candidate check unit 25 gives, to the mode switching unit 21, information indicating that the person candidate is present at the estimated position. In a case of including a plurality of sound wave sensors 12, the person candidate check unit 25 compares the estimated time of flight and actual time of flight for each of the sound wave sensors 12. In a case of two-dimensionally evaluating an error to fall within the predetermined range, the person candidate check unit 25 gives, to the mode switching unit 21, the information indicating that the person candidate is present at the estimated position. The person candidate check unit 25 gives, to the estimated position correction unit 26, information indicating that the estimated position of the person candidate is corrected in a case in which reception is not performed by the sound wave sensor 12 and a case in which a difference between the estimated time of flight and the actual time of flight is larger than the predetermined range. In this example, the time of flight obtained from the sound wave sensor 12 is compared with the estimated time of flight, but comparison may be performed by using positional information corresponding to the time of flight and the estimated time of flight.

When receiving the information of correcting the estimated position of the person candidate from the person candidate check unit 25, the estimated position correction unit 26 corrects the estimated position in a direction of connecting the imaging unit 11 to the estimated position. The estimated position can be corrected to be a position shifted from the current estimated position by a diameter of an effective sonar detection range in a direction of connecting the imaging unit 11 to the estimated position, for example. The corrected estimated position is passed to the control information calculation unit 23.

When the mode switching unit 21 switches the state of the vehicle 1 to the backward movement mode from the forward movement mode, the display processing unit 27 displays the image data taken by the imaging unit 11 on the HMI 17. In a case in which the person checking mode continues for a predetermined time, the display processing unit 27 outputs, to the HMI 17, information of prompting visual check. Additionally, the display processing unit 27 outputs, to the HMI 17, information of calling attention to presence of a pedestrian in the rear of the vehicle 1 at the time when the mode switching unit 21 switches the state of the vehicle 1 to the backward movement restriction mode from the person checking mode.

The acceleration control unit 15 controls acceleration of the vehicle 1. In a case in which an operation by which the vehicle speed exceeds a predetermined speed is performed in the backward movement restriction mode, the acceleration control unit 15 prohibits acceleration.

The braking control unit 16 controls braking of the vehicle 1. The braking control unit 16 applies a brake in a case in which a person is present within a predetermined distance from the vehicle 1 in the backward movement restriction mode.

The HMI 17 is a driver interface that gives information to a driver of the vehicle 1 by at least one of voice and display, and receives an operation from the driver. The HMI 17 is a touch panel on which a speaker is mounted, for example.

Figure 13:
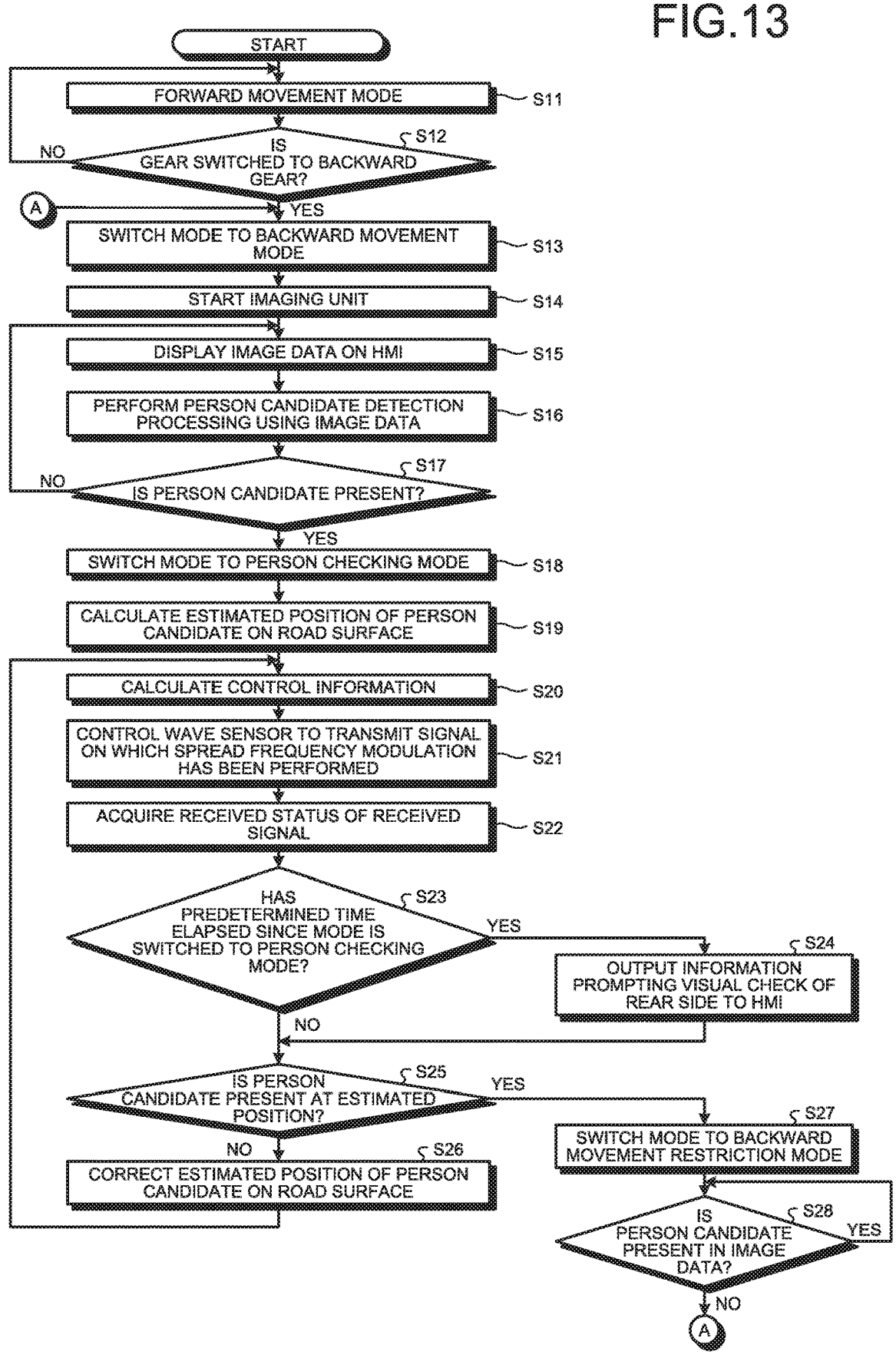
FIG. 13 is a flowchart illustrating an example of a procedure of a driving support method according to the first embodiment.

The following describes an operation of the vehicle 1 including such a driving support apparatus. FIG. 13 is a flowchart illustrating an example of a procedure of a driving support method according to the first embodiment. First, when the vehicle 1 is in the forward movement mode in which the gear is positioned at a position other than the backward gear (Step S11), the gear detection unit 13 determines whether the gear is switched to the backward gear (Step S12). In the forward movement mode, the imaging unit 11 disposed in the rear of the vehicle 1 is in a stopped state. When the gear is not switched to the backward gear (No at Step S12), processing is returned to Step S11.

On the other hand, when the gear is switched to the backward gear (Yes at Step S12), the mode switching unit 21 switches the control mode of the vehicle 1 to the backward movement mode from the forward movement mode (Step S13). When the mode is switched to the backward movement mode, the mode switching unit 21 starts the imaging unit 11 disposed in the rear of the vehicle 1 (Step S14). Subsequently, the display processing unit 27 causes the HMI 17 to display the image data taken by the imaging unit 11 (Step S15), and the image processing unit 22 performs person candidate detection processing by using the image data (Step S16). As a result of detection, if the person candidate is not present (No at Step S17), processing is returned to Step S15. In the backward movement mode, the sound wave sensor 12 detects the obstacle by the pulse scheme.

When the person candidate is present (Yes at Step S17), the mode switching unit 21 switches the control mode of the vehicle 1 to the person checking mode from the backward movement mode (Step S18).

The image processing unit 22 calculates the estimated position of the person candidate on the road surface (Step S19). In calculating the estimated position, the estimated position of the person candidate on the image data is obtained, a three-dimensional azimuth angle of the estimated position is calculated from the estimated position on the image data and the mounting angle and the angle of view of the imaging unit 11, and the estimated position of the person candidate on the road surface is calculated by using the three-dimensional azimuth angle and an installation height of the imaging unit 11.

Subsequently, the control information calculation unit 23 calculates control information used for controlling the sound wave sensor 12 in the person checking mode (Step S20). In calculating the control information, the estimated distance between the sound wave sensor 12 and the estimated position is obtained based on the estimated position of the person candidate on the road surface and the installation position of the sound wave sensor 12 on the vehicle 1. The estimated propagation time of the sound wave as the control information to the estimated position is obtained from the estimated distance and the sonic speed.

Subsequently, the sound wave sensor control unit 24 controls the sound wave sensor 12 to transmit the transmitted signal on which spread spectrum modulation has been performed (Step S21). As a result, the transmitted signal subjected to spread spectrum modulation is transmitted from the sound wave sensor 12.

In a case in which a person is present at the estimated position, the transmitted signal is reflected by the person, and the reflected transmitted signal arrives at the sound wave sensor 12 as the received signal. That is, after a time that is twice as long as the estimated propagation time in the control information (estimated time of flight) has elapsed after the transmitted signal is transmitted from the sound wave sensor 12, the received signal arrives at the sound wave sensor 12. On the other hand, in a case in which the person candidate is not present at the estimated position, the received signal is not reflected, and the received signal is not returned to each of the sound wave sensors 12. In a case in which the person candidate is present at a position different from the estimated position, the received signal arrives at the sound wave sensor 12 after a time different from the time that is twice as long as the estimated propagation time in the control information has elapsed. The sound wave sensor 12 acquires the reception status of the received signal (Step S22), and gives the reception status to the person candidate check unit 25. In a case of the spread spectrum modulation scheme, there is a time difference after receiving the head part of the reflected wave until the output from the correlator reaches the peak value as described above. Thus, the person candidate needs to be checked after correcting the reception time by the sound wave sensor 12 or the person candidate check unit 25.

Subsequently, the display processing unit 27 determines whether a predetermined time has elapsed since the mode is switched to the person checking mode (Step S23). When the predetermined time has elapsed (Yes at Step S23), the display processing unit 27 outputs, to the HMI 17, information for prompting the driver to visually check the rear side (Step S24). The information for prompting visual check may be information that can be displayed, or voice information.

After Step S24, or when the predetermined time has not elapsed (No at Step S23), the person candidate check unit 25 determines whether the person candidate is present at the estimated position (Step S25). When the person candidate is not present at the estimated position (No at Step S25), the estimated position correction unit 26 corrects the estimated position of the person candidate on the road surface (Step S26). In a case of receiving the received signal at time that is greatly different from time at which the estimated time of flight has elapsed after transmitting the transmitted signal, or in a case of not receiving the received signal, the person candidate check unit 25 determines that the person candidate is not present at the estimated position. Processing is then returned to Step S20.

When the person candidate is present at the estimated position (Yes at Step S25), the person candidate check unit 25 notifies the mode switching unit 21 of information indicating that the person candidate is present at the estimated position, and the mode switching unit 21 switches the control mode to the backward movement restriction mode from the person checking mode (Step S27). The display processing unit 27 outputs, to the HMI 17, person attention calling information representing that a person is present within the predetermined range. The person attention calling information may be information that can be displayed or is speech information. In the backward movement restriction mode, the acceleration control unit 15 prohibits acceleration with which the vehicle speed exceeds a predetermined speed, and the braking control unit 16 applies a brake when a person is present within a predetermined distance.

Subsequently, the person candidate check unit 25 determines whether the person candidate is present in the image data (Step S28). When the person candidate is present in the image data (Yes at Step S28), the state is caused to be a wait state until the person candidate disappears. When the person candidate disappears from the image data (No at Step S28), processing is returned to Step S13.

In a case of transmitting the continuous wave as the transmitted signal, the sound wave sensor control unit 24 controls the sound wave sensor 12 to transmit the transmitted signal. The sound wave sensor control unit 24 also controls the sound wave sensor 12 to repeat a transmission period and a reception period. The transmission period is for transmitting the transmitted signal of the continuous wave in a time shorter than the estimated time of flight. The reception period is for receiving the received signal of the continuous wave. The reception period is a period obtained by taking a margin for the estimated time of flight after the transmission period ends. This processing is then repeatedly performed.

Figure 14:
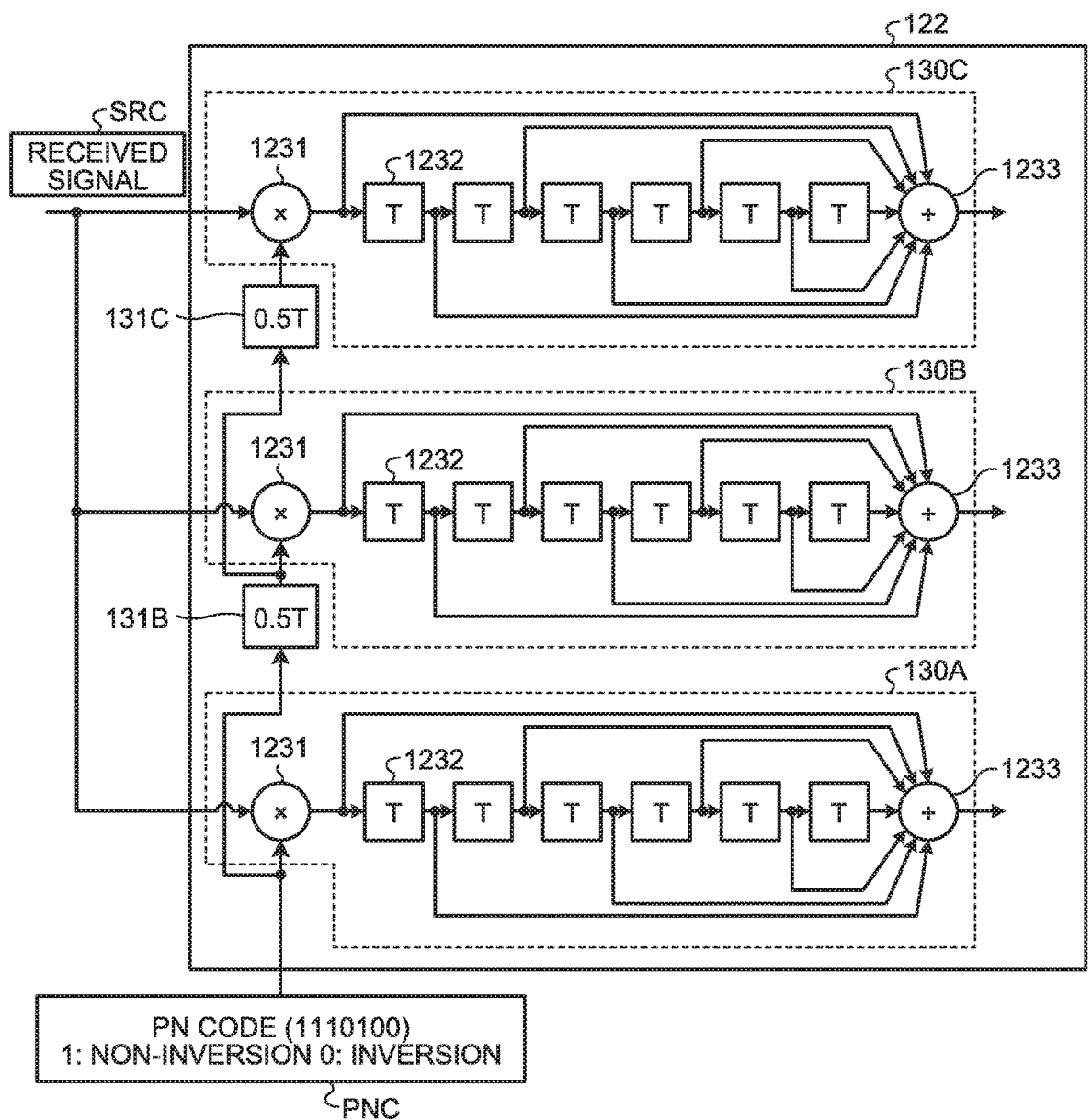
FIG. 14 is a diagram illustrating another configuration example of the demodulation unit.

The configuration of the demodulation unit 122 is not limited to the configuration illustrated in FIG. 5B, and various configurations can be used. FIG. 14 is a diagram illustrating another configuration example of the demodulation unit. The demodulation unit 122 is constituted of a sliding correlator. In the demodulation unit 122, three filters 130A to 130C each including the multiplier 1231, the n−1 delay units 1232, and the adder 1233 are arranged in parallel. Delay units 131B and 131C are respectively connected to the filters 130B and 130C, the delay units 131B and 131C for delaying an input of the PN code to the multiplier 1231 as compared with the filter 130A. The delay units 131B and 131C are set such that the input of the PN code to the multiplier 1231 in the filter 130C is delayed as compared with the input of the PN code PNC to the multiplier 1231 in the filter 130B. In this case, setting is made such that PN codes are respectively input to the filters 130B and 130C while being delayed by 0.5 T and 1 T with respect to the filter 130A.

In such a configuration, the input of the received signal SRC and the input of the PN code PNC may be matched with each other in any of the filters 130A to 130C with high possibility. For example, an input timing of the PN code PNC is not matched with the input of the received signal SRC in the filters 130A and 130C but matched with it in the filter 130B in some cases. In this case, the PN code PNC does not disappears from the output carrier, and a signal having small amplitude is obtained in the filters 130A and 130C. However, in the filter 130B, the PN code PNC disappears from the output carrier and a signal to be a continuous wave having large amplitude can be obtained. In both cases, the noise is reduced by averaging.

In this way, by causing the filters 130A to 130C whose demodulation timing have been changed to operate in parallel, the received signal can be detected by one of the filters 130A to 130C having the largest output amplitude even when there is an error in the estimated position of the person candidate and the phase of the PN code of the received signal SRC is slightly shifted. By specifying the filter having the largest output amplitude among the filters 130A to 130C, a correct distance between the sound wave sensor 12 and the person candidate can be specified based on a shift from a reference filter. FIG. 14 illustrates a case in which the three filters 130A to 130C are disposed, but an optional number of filters can be disposed.

Figure 15:
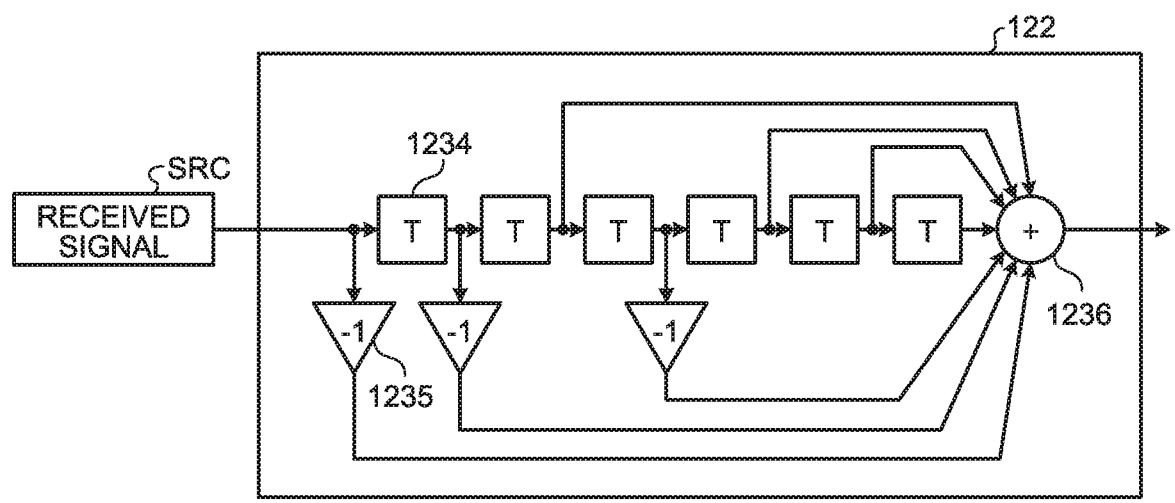
FIG. 15 is a diagram illustrating another configuration example of the demodulation unit.

FIG. 15 is a diagram illustrating another configuration example of the demodulation unit. The demodulation unit 122 is constituted of a correlator. The demodulation unit 122 includes n−1 delay units 1234, an inverter 1235 disposed on an output side of the delay unit 1234 or an output side of the received signal SRC corresponding to the PN code to be used, and an adder 1236 that adds up the input received signal SRC and outputs from the delay units 1234. In the demodulation unit 122 in FIG. 15, although a multiplier that demodulates the received signal SRC with the PN code PNC is not disposed, a signal is inverted by the inverter 1235 fixed on a circuit. In the demodulation unit 122 having such a configuration, phases of signals input to the adder 1236 becomes the same as each other when a bit matched with an inversion/non-inversion pattern fixed to each of the delay units 1234 is provided. Furthermore, all signals are added up in an enhanced manner, and a peak value is output. By acquiring a timing at which the demodulation unit 122 outputs the peak value based on a time at which the transmitted signal is transmitted, a shift between the actual position and the estimated position of the person candidate can be obtained. As a result, the distance between the sound wave sensor 12 and the person candidate can be obtained. This correlator outputs a large amplitude when the state is caused to be a state of adding up signals corresponding to one cycle of the code, and does not output a large amplitude at other timings. Thus, a signal having a wide pulse corresponding to one cycle seems to be compressed to have a width of a bit cycle 1 T in appearance. It can be also said that reception power corresponding to one cycle is concentrated in the bit cycle 1 T by the correlator. In terms of this property, the spread spectrum modulation scheme may also be called a pulse compression scheme. Even in a configuration of canceling the PN code PNC before the delay unit, or in a configuration of canceling the PN code PNC by a fixed inverter in the correlator, the modulation gain (noise suppression ratio) is the same, and larger modulation gain can be obtained as the code length is longer.

First Modification of First Embodiment

In the original first embodiment described above, a case of using the direct-sequence spread spectrum modulation scheme as the spread spectrum modulation scheme is exemplified. The embodiment of the present disclosure is not limited thereto. A first modification exemplifies a case of using a chirp modulation scheme as the spread spectrum modulation scheme. The following describes only portions different from the first embodiment.

Figure 16A:
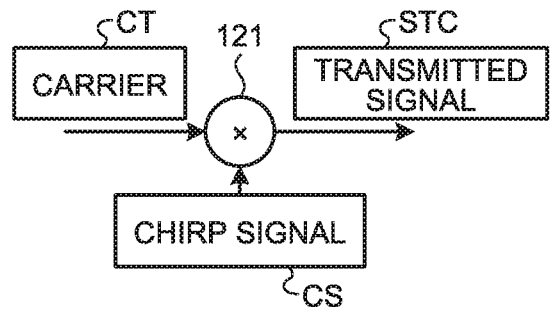
FIG. 16A is a diagram schematically illustrating a configuration example of the modulation unit using a chirp modulation scheme.
Figure 16B:
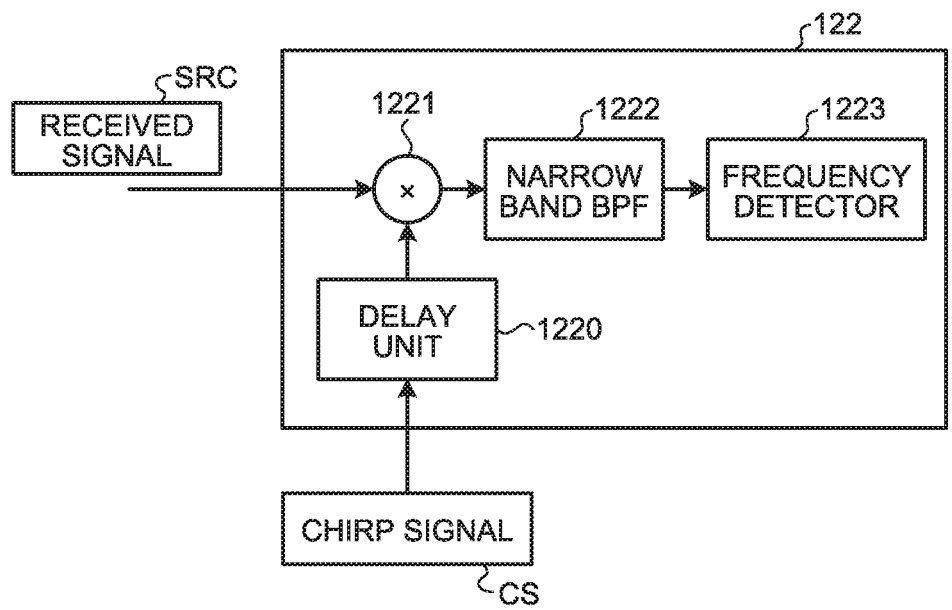
FIG. 16B is a diagram schematically illustrating a configuration example of the demodulation unit using the chirp modulation scheme.
Figure 17:
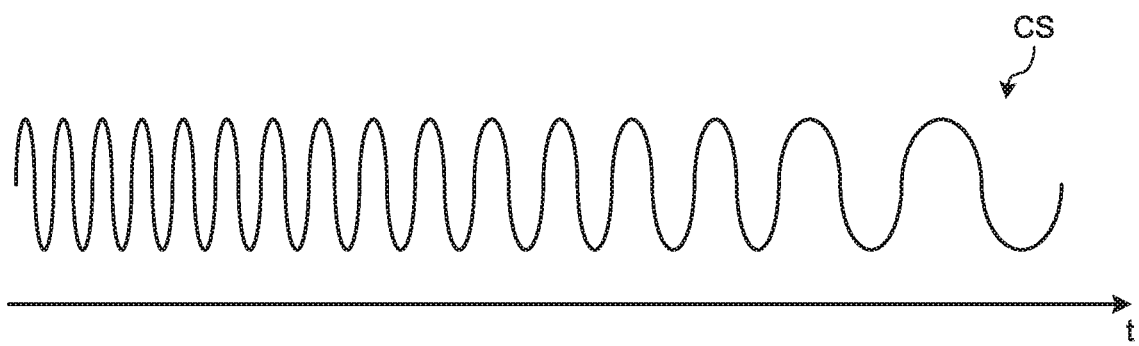
FIG. 17 is a diagram illustrating an example of a chirp signal.

FIG. 16A is a diagram schematically illustrating a configuration example of the modulation unit using the chirp modulation scheme. FIG. 16B is a diagram schematically illustrating a configuration example of the demodulation unit using the chirp modulation scheme. FIG. 17 is a diagram illustrating an example of a chirp signal. As illustrated in FIG. 16A, the modulation unit 121 is a multiplier that multiplies a carrier CT having a single frequency by a chirp signal CS as a spreading sequence, and thereby a transmitted signal STC is generated. As illustrated in FIG. 17, the chirp signal CS is a signal whose frequency changes at a predetermined change rate as time elapses.

As illustrated in FIG. 16B, the demodulation unit 122 includes a delay unit 1220, a multiplier 1221, a narrow band-pass filter 1222, and a frequency detector 1223. The multiplier 1221 outputs a carrier having a single frequency by multiplying the received signal SRC, which has been reflected by the person candidate and contains noise, by the chirp signal CS delayed by the delay unit 1220 that is capable of changing a delay amount. The chirp signal CS of the demodulation unit 122 is the same as the chirp signal CS of the modulation unit 121. The delay amount given from the delay unit 1220 corresponds to the flight time of the sound wave with respect to the estimated position of the person candidate. The narrow band-pass filter 1222 is a filter whose carrier frequency matches with a center frequency. The narrow band-pass filter 1222 removes noise in the carrier output from the multiplier 1221. The frequency detector 1223 detects the frequency of the carrier that has passed through the narrow band-pass filter 1222.

Figure 18:
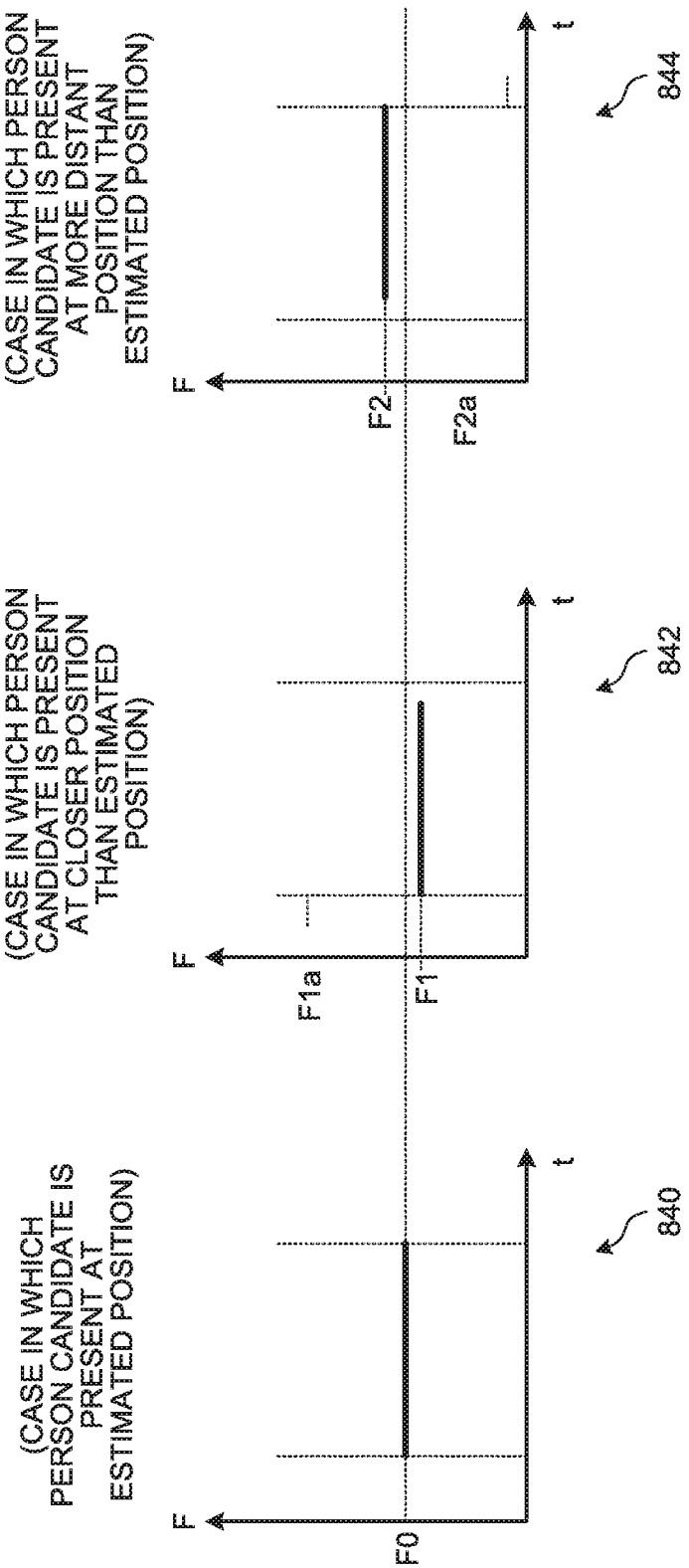
FIG. 18 is a diagram illustrating an example of a method of correcting the estimated position of the person candidate in a case of using the chirp modulation scheme.
Figure 19:
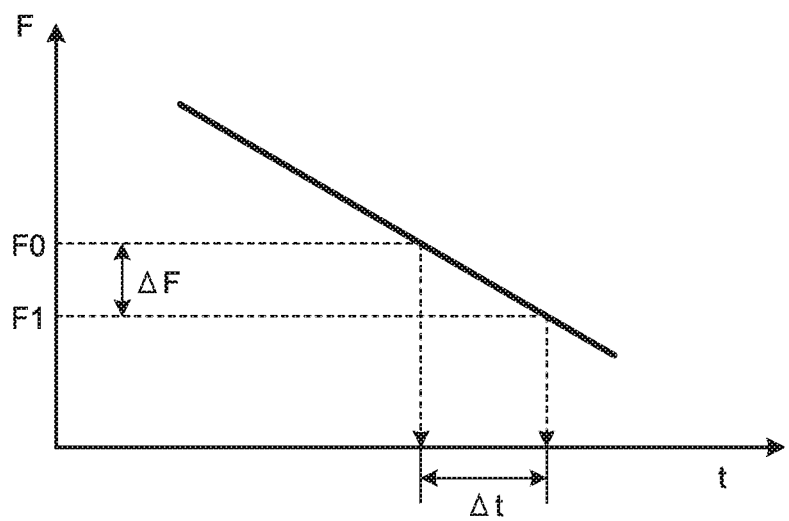
FIG. 19 is a diagram illustrating an example of a change in a frequency of the chirp signal with respect to time.

FIG. 18 is a diagram illustrating an example of a method of correcting the estimated position of the person candidate in a case of using the chirp modulation scheme. FIG. 19 is a diagram illustrating an example of a change in a frequency of the chirp signal with respect to time. In those drawings, a horizontal axis represents time, and a vertical axis represents a frequency. In a case in which the person candidate is present at the estimated position, the delay amount given from the delay unit 1220 is the time of flight of the sound wave corresponding to the estimated position of the person candidate. Thus, a reception timing of the received signal by the demodulation unit 122 matches with a demodulation timing of the chirp signal, and the frequency of the chirp signal added to the received signal is the same as the frequency of the chirp signal to be multiplied by the multiplier 1221. Therefore, as represented by a graph 840, the frequency of the chirp signal in the demodulated carrier is canceled, and the demodulated carrier is caused to have a frequency F0 (carrier frequency) as a reference. The person candidate check unit 25 holds the frequency F0 as a reference.

In a case in which the person candidate is present at a closer position than the estimated position, the delay amount given from the delay unit 1220 is the time of flight of the sound wave corresponding to the estimated position of the person candidate, so that the received signal arrives earlier than the demodulation timing of the chirp signal by the demodulation unit 122. At the demodulation timing, the chirp signal is a signal whose frequency lowers in proportion to time, so that the frequency of the received signal lowers because of the early arrival. When the received signal is demodulated by using the chirp signal that is delayed by the time corresponding to the estimated position of the person candidate, as represented in a graph 842, a frequency F1 of the demodulated carrier becomes lower than the frequency F0 as a reference. At the time before the demodulation timing, a frequency F1a that is larger than the frequency F1 appears as a component that is not demodulated. The component of the frequency F1a is removed by the narrow band-pass filter 1222.

In a case in which the person candidate is present at a more distant position than the estimated position, the delay amount given from the delay unit 1220 is the time of flight of the sound wave corresponding to the estimated position of the person candidate. Thus, the received signal arrives later than the demodulation timing of the chirp signal by the demodulation unit 122. The chirp signal is a signal whose frequency lowers in proportion to time, so that the frequency of the received signal is increased at the demodulation timing corresponding to its later arrival. When the received signal is demodulated by using the chirp signal that is delayed by the time corresponding to the estimated position of the person candidate, as represented in a graph 844, a frequency F2 of the demodulated carrier becomes higher than the frequency F0 as a reference. At the time later than the timing at which demodulation with the chirp signal is finished, a frequency F2a that is lower than the frequency F2 appears as a component that is not demodulated. The component of the frequency F2a is removed by the narrow band-pass filter 1222.

As illustrated in FIG. 19, the chirp signal is a signal whose frequency lowers at a constant rate with a lapse of time. Thus, for example, a frequency difference $\Delta F$ between the frequency F0 as a reference and the frequency F1 detected in the graph 842 can be converted into a time difference $\Delta t$ as shown in FIG. 19. By using the time difference $\Delta t$ and the sonic speed V, a shift amount of the person candidate from the estimated position can be obtained. In this case, it is considered that the person candidate is present at a position that is closer to the vehicle 1 by the calculated shift amount from the estimated position in a direction of connecting the imaging unit 11 and the estimated position. In a case of the frequency F2 detected in the graph 844, the estimated position of a person can be similarly corrected. In this case, it is considered that the person candidate is present at a position that is more distant from the vehicle 1 by the calculated shift amount from the estimated position in a direction of connecting the imaging unit 11 and the estimated position. Such correction of the position of the person candidate is performed by the person candidate check unit 25 of the ECU 14.

In a case in which the reception status indicates that the received signal is not received within a predetermined time after transmitting the transmitted signal, the person candidate check unit 25 notifies the estimated position correction unit 26 of information indicating to correct the estimated position of the person candidate.

Although FIG. 16B illustrates a case in which the demodulation unit 122 is constituted of the analog filter, the modification of the embodiment is not limited thereto. For example, the demodulation unit 122 may be constituted of a digital filter that can perform baseband processing. In this case, the demodulation unit 122 is constituted of a correlator. The correlator can prolong the transmission period of the transmitted signal by changing an integration period in accordance with the transmission period of the transmitted signal. Therefore, a bandwidth can be changed more easily as compared with the case of using the analog filter, and also the S/N ratio can be highly improved. The direct-sequence spread spectrum modulation scheme and the chirp modulation scheme may be combined to perform transmission.

Second Modification of First Embodiment

A second modification exemplifies a case of using the frequency hopping scheme as the spread spectrum modulation scheme. The following describes only portions differing from the original first embodiment.

Figure 20:
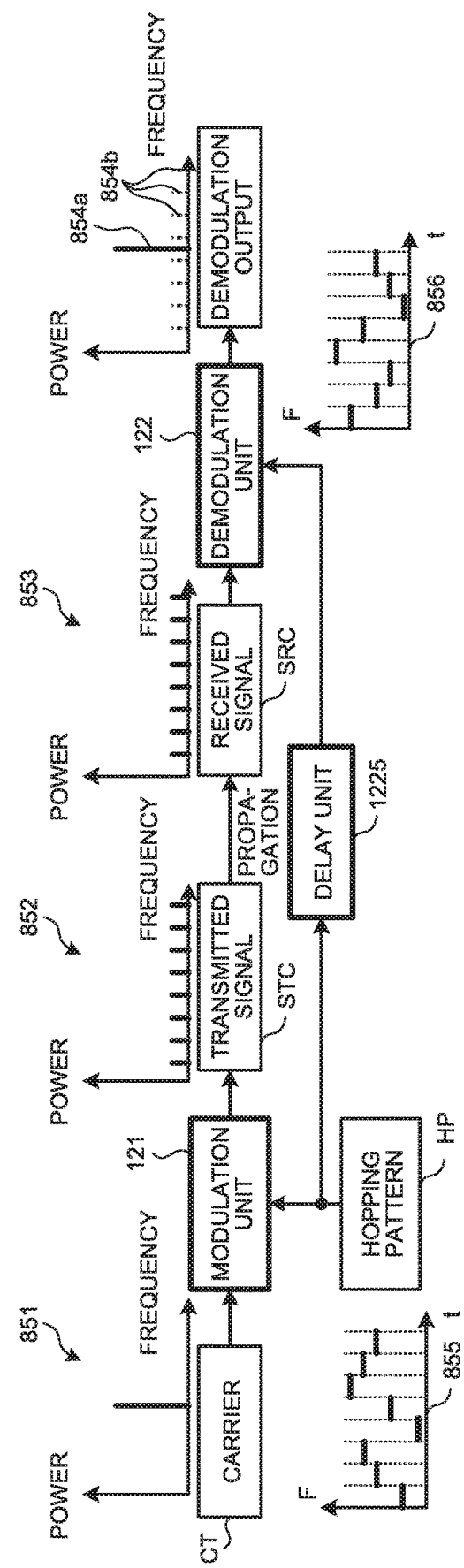
FIG. 20 is a diagram schematically illustrating a configuration example of the modulation unit and the demodulation unit using a frequency hopping scheme.

FIG. 20 is a diagram schematically illustrating a configuration example of the modulation unit and the demodulation unit using the frequency hopping scheme. The modulation unit 121 and the demodulation unit 122 are each constituted of a frequency modulation (FM) modulator, and the demodulation unit 122 is connected to a delay unit 1225. The modulation unit 121 performs spread spectrum modulation on the carrier CT, whose power density to frequency is represented by a graph 851, by using a hopping pattern HP whose frequency to time is represented by a pseudo-random graph 855. As a result, the transmitted signal STC, whose power density to frequency is represented by a graph 852, is transmitted.

The demodulation unit 122 demodulates the received signal SRC containing noise, whose power density to the frequency is represented by a graph 853, by using the hopping pattern HP whose frequency to time is represented by a pseudo-random graph 856. The hopping pattern HP is input to the demodulation unit 122 via the delay unit 1225. The delay unit 1225 is configured to output the hopping pattern HP to the demodulation unit 122 with a delay corresponding to the estimated time of flight after being input to the modulation unit 121. The delay unit 1225 outputs the hopping pattern HP to the demodulation unit 122 such that a direction of a frequency change in the hopping pattern HP is reversed to that of the hopping pattern HP input to the modulation unit 121. Because of this, the frequency change is canceled when the actual time of flight of the transmitted signal matches with the estimated flight time, and thereby the carrier signal having a constant frequency, in which power distribution is concentrated, is obtained as represented in a graph 854a. Similarly to the case of using the direct-sequence spread spectrum modulation scheme, processing gain can be obtained by adding up the carrier signals demodulated by combining the delay unit and the adder over the cycle of the hopping pattern HP. However, in a case in which the actual time of flight of the transmitted signal is not matched with the estimated time of flight, as represented in a graph 854b, obtained is a carrier in which the frequency change is not canceled and the power density is kept spread. Thus, by adjusting the delay time of the delay unit 1225 to concentrate the power density in the carrier frequency, a time that is delayed during a period from transmission of the transmitted signal to reception of the received signal can be acquired. The sound wave sensor 12 notifies this delayed time as the time of flight of the sound wave. The person candidate check unit 25 of the ECU 14 compares the time of flight of the sound wave reported from sonar with the distance to the position of the person candidate, and if a result thereof falls within a permissible error range, determines that a person is actually present at the position of the person candidate. In a case in which the sound wave sensor 12 does not detect the carrier in the output from the demodulation unit 122, the sound wave sensor 12 does not report the time of flight. When the sound wave sensor 12 does not report the time of flight of the sound wave, the person candidate check unit 25 of the ECU 14 does not determine that a person is actually present at the position of the person candidate. The condition that "the time of flight of the transmitted signal is matched with the estimated time of flight" may include a slight difference, and includes a case in which the time of flight of the transmitted signal corresponds to the estimated time of flight.

As described above, in the first embodiment, the person candidate as the specific obstacle candidate is detected by the image processing unit 22 being the data processing unit from the image data taken by the imaging unit 11 being the environment information acquisition unit, and the estimated position of the person candidate is calculated. When the person candidate is detected, the mode switching unit 21 switches the first mode for detecting the presence of the obstacle in a predetermined direction to the second mode for checking whether the person candidate is present at the estimated position. The sound wave sensor control unit 24 causes the sound wave sensor 12 to transmit the transmitted signal obtained by modulating the sound wave using the spread spectrum modulation scheme in the second mode, and after transmitting the transmitted signal, performs control for demodulating the received signal that is the transmitted signal reflected by the person candidate and received by the sound wave sensor 12. The person candidate check unit 25 checks whether the person candidate is present at the estimated position based on the reception status of the received signal in the sound wave sensor 12. By modulating the sound wave by using the spread spectrum modulation scheme, and prolonging the transmission period to be the spreading sequence length to increase the power product of the transmitted signal as compared with a case of not modulating the sound wave, the power product of the received signal reflected by the person candidate can also be increased to be larger than that in the case of not modulating the sound wave. The demodulation timing of the received signal by the sound wave sensor 12 is matched with the reception timing of the received signal based on the estimated position of the person candidate. Thus, a ratio between the demodulated signal and the noise, that is, the S/N ratio can be improved by adding up the signals over the spreading sequence length, and a received signal larger than the noise level can be obtained due to the modulation gain. As a result, even in a situation in which noise is present, it is possible to detect presence of the person candidate present at the estimated position of the person candidate detected by the imaging unit 11.

By detecting the shift between the demodulation timing and the reception timing of the received signal, a shift of the actual position of the person candidate from the estimated position can be obtained. For example, in the chirp modulation scheme, when the actual position of the person candidate has been shifted from the estimated position, the frequency of the demodulated carrier is changed as compared with the case in which the person candidate is present at the estimated position. This frequency change corresponds to a shift in the propagation time between the estimated position and the position at which the person candidate is actually present, and a shift of the actual position from the estimated position can be found. Thus, the actual position of the person candidate can be specified.

In a parking lot or the like, interference may be caused by receiving a transmitted signal from other vehicles. When a length of a transmitted signal of a host vehicle is prolonged, there is a high possibility that the transmitted signal causes interference with the other vehicles. Even when the length of the transmitted signal is short, the echo may be left for a long time due to multiple reflection. In this regard, the PN code modulation and the chirp modulation described in the first embodiment are each a type of a modulation scheme that is called the spread spectrum modulation that has an advantage that interference from noise having a constant frequency is hardly received because a bandwidth of the signal is widened. Even when a signal to be interference is another signal subjected to spread spectrum modulation, if timings as a key to demodulation are different, such as a code phase of the PN code and a sweeping start time for chirp modulation, interference caused between the signals subjected to spread spectrum modulation is reduced. That is, even when vehicles 1 each including the driving support apparatus according to the first embodiment face each other, both vehicles 1 can detect the person candidate without receiving large interference.

The control information calculation unit 23 calculates the estimated distance between the estimated position and the sound wave sensor 12, and the sound wave sensor control unit 24 performs control for transmitting the transmitted signal of the sound wave from the sound wave sensor 12 with transmission power larger than the transmission power in the first mode when the estimated distance is larger than the predetermined value in the second mode. In a case in which the estimated distance is larger than the predetermined value, the noise is mainly background noise, and a received signal larger than the noise level is obtained by transmitting the sound wave with the transmission power larger than the transmission power in the first mode. As a result, even in a situation in which the noise is present, presence of the person candidate present at the estimated position of the person candidate detected by the imaging unit 11 can be detected.

Since the mode is switched to the person checking mode in a case of detecting the person candidate from the image data, another obstacle can be detected by using the normal pulse scheme during which the person candidate is not detected. Additionally, when a pair of two edges in the vertical direction stands side by side in the image data, the person candidate is assumed to be present and is detected. Thus, there is no influence from a silhouette of an upper part of a body as in a case where a person is holding an umbrella, wearing winter clothes, or carrying a backpack. Accordingly, the person candidate can be detected more easily than the case of detecting the person candidate using the silhouette of the entire person.

While the first embodiment describes the case of detecting the person candidate from the image data, means for detecting the person candidate is not limited to processing of an image photographed by a camera. For example, when the echo received in the first mode is weak and an object having low reflectivity to the sound wave is estimated, there may be provided a function of using the second mode and checking whether the object is present in a state in which the S/N ratio is enhanced.

Second Embodiment

The foregoing first embodiment describes the example of demodulating the modulated received signal by using the spreading sequences corresponding to one cycle. In this case, there is possibility that the input timing of the received signal shifts from the demodulation timing using the spreading sequence. Considering such possibility, the second embodiment describes a driving support apparatus, a vehicle, and a driving support method. A case of using a maximum length Pseudo Noise (PN) sequence modulation scheme as the spread spectrum modulation scheme will be exemplified hereinafter.

FIG. 21 is a diagram illustrating an example of a matching degree of the phase based on the input timing of the received signal with respect to the demodulation timing using the PN code. The following describes a case of using the 7-bit PN code "1110100" similarly to the first embodiment. Bitwise rotation (or Circular shift) of PN code is performed to calculate a matching degree of bits. The matching degree is obtained by subtracting the number of mismatches from the number of matches of bits. Specifically, as illustrated in FIG. 21, the matching degree becomes the maximum when the delay is an integral multiple of one cycle of the PN code (0 T, 7 T). When the delay is not an integral multiple of one cycle of the PN code, the number of matches and the number of mismatches cancel out each other.

When the phase the PN code is not matched with the phase of the received signal, in other words, when the demodulation timing shifts from the input timing of the received signal, the number of matches and the number of mismatches cancel out each other, and an output becomes small. In contrast, when the phase of the PN code is matched with the phase of the received signal, complete matching is achieved, and the output becomes large. By utilizing such characteristics, the phase of the code, that is, the delay amount can be found.

The PN code corresponding to at least one cycle needs to be transmitted. However, when there is an error in estimation of the delay time, positive and negative do not cancel out each other only by transmitting the PN code corresponding to one cycle. FIG. 22 is a diagram for explaining a problem in a case of transmitting the PN code corresponding to one cycle. In this figure, matching degrees are exemplified, which are obtained on the assumption that one cycle of the PN code is applied as a detection section (integration section for correlation detection) of the demodulation unit 122 (correlator) illustrated in FIG. 5B or FIG. 15, and also assuming that the received signal is input with delay against the demodulation timing using the PN code.

In a case of the transmitted signal that is modulated with the PN code corresponding to one cycle, an inner part of the correlator takes a significant value in a case in which reception of the received signal is matched with the demodulation timing using the PN code, that is, in a case in which a delay difference is ±0 T. Herein, the significant value means a value not including a state in which whether the received signal is matched with the PN code is not determined.

However, if reception of the received signal shifts earlier or later even slightly from the demodulation timing using the PN code, a non-signal section is generated in the detection section. The non-signal section is indicated by a mark "?" in FIG. 22. Such a non-signal section becomes indeterminate, and the matching degree cannot be calculated. That is, the number of matches and the number of mismatches cannot cancel out each other, and a detection result (output of correlation detection) becomes indeterminate. In this way, a problem is caused such that the number of matches and the number of mismatches do not cancel out each other only with the PN code corresponding to one cycle.

Figure 23:
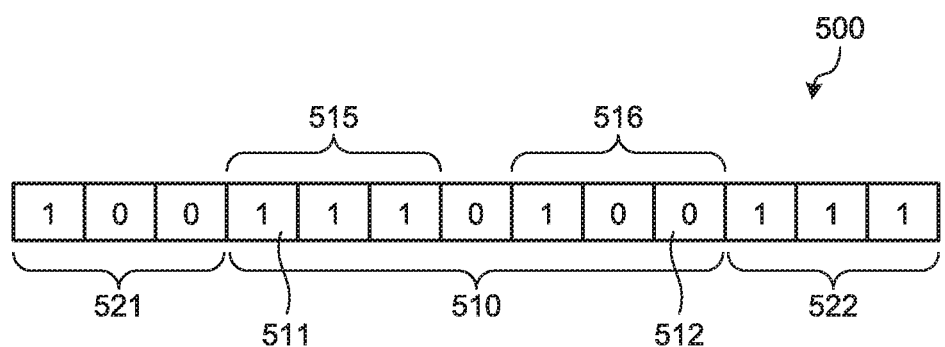
FIG. 23 is a diagram illustrating an example of a PN code according to a second embodiment.

Considering above, in the second embodiment, a PN code 500 is used for modulation. The PN code 500 is obtained by adding codes to the front and the rear of a PN code of one cycle. The additional codes have continuity of code phases toward the PN code of one cycle. Specifically, FIG. 23 is a diagram illustrating an example of the PN code according to the second embodiment. The PN code 500 according to the second embodiment includes a main body part 510 corresponding to the PN code of one cycle, and extension parts 521 and 522 corresponding to the additional codes that are added the front and the rear of the main body part 510, respectively. The extension part 521 is continuously joined to the front of the main body part 510, and the extension part 522 is continuously joined to the rear of the main body part 510. Each of the extension parts 521 and 522 has a length shorter than one cycle of the PN code. The extension part 521 has the same array as that of a bit string 516 including a predetermined number of bits from the rearmost bit 512 in the main body part 510. The extension part 522 has the same array as that of a bit string 515 including a predetermined number of bits from the frontmost bit 511 in the main body part 510. Herein, the length of each of the extension parts 521 and 522 is 3 bits. Thus, the detection result can be output in 3-bit cycles before and after in the case where reception of the received signal is matched with the demodulation timing using the PN code. In the drawing, although the extension parts 521 and 522 are respectively disposed at the front and the rear of the main body part 510, they may be disposed at either the front or the rear of the main body part 510. In the second embodiment, the modulation unit 121 modulates the carrier using the PN code as illustrated in FIG. 23.

FIG. 24 is a diagram illustrating an example of a timing of demodulation and reception of the received signal in a case of using the PN code according to the second embodiment. As illustrated in the drawing, a significant detection result is output over the entire detection section with a delay difference ranging from −3 T to +3 T. By examining the code phase with which the largest output can be obtained, the delay difference can be specified. That is, if the delay difference ranges from −3 T to +3 T, an error between the actual position of the person candidate and the estimated position can be obtained.

Not only in the case of using PN code modulation but also in a case of performing modulation by using the chirp signals corresponding to one cycle by chirp modulation, the modulation unit 121 can use the chirp signal obtained by adding the extension part to the main body part similarly to the above description.

Figure 25A:
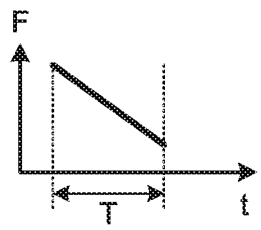
FIG. 25A is a diagram illustrating a frequency change of the chirp signal corresponding to one cycle with respect to time.
Figure 25B:
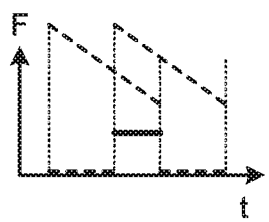
FIG. 25B is a diagram illustrating an example of a signal obtained by demodulating a received signal that is chirp-modulated with the chirp signal of FIG. 25A.
Figure 25C:
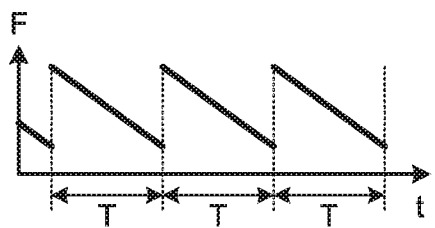
FIG. 25C is a diagram illustrating a frequency change of the chirp signal with respect to time in a case of continuous transmission.
Figure 25D:
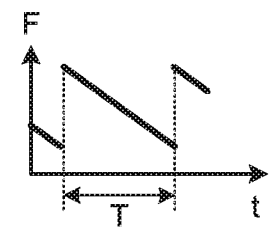
FIG. 25D is a diagram illustrating an example of a frequency change of an extended chirp signal with respect to time.
Figure 25E:
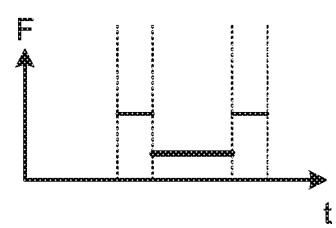
FIG. 25E is a diagram illustrating an example of a signal obtained by demodulating a received signal that is chirp-modulated with the chirp signal of FIG. 25D.
Figure 25F:
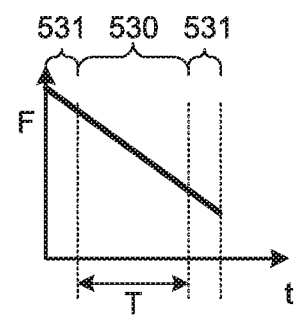
FIG. 25F is a diagram illustrating an example of a frequency change of an extended chirp signal with respect to time according to the second embodiment.
Figure 25G:
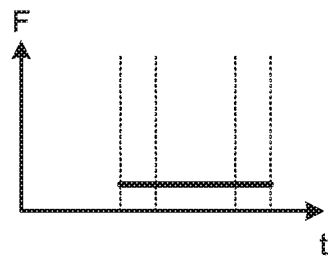
FIG. 25G is a diagram illustrating an example of a signal obtained by demodulating a received signal that is chirp-modulated with the chirp signal of FIG. 25F.

FIG. 25A to FIG. 25G are diagrams for explaining an example of the chirp signal. FIG. 25A is a diagram illustrating a frequency change of the chirp signal corresponding to one cycle with respect to time. FIG. 25B is a diagram illustrating an example of a signal obtained by demodulating the received signal that is chirp-modulated with the chirp signal of FIG. 25A. FIG. 25C is a diagram illustrating a frequency change of the chirp signal with respect to time in a case of performing continuous transmission. FIG. 25D is a diagram illustrating an example of a frequency change of an extended chirp signal with respect to time. FIG. 25E is a diagram illustrating an example of a signal obtained by demodulating the received signal that is chirp-modulated with the chirp signal of FIG. 25D. FIG. 25F is a diagram illustrating an example of a frequency change of the extended chirp signal with respect to time according to the second embodiment. FIG. 25G is a diagram illustrating an example of a signal obtained by demodulating the received signal that is chirp-modulated with the chirp signal of FIG. 25F. In those drawings, a horizontal axis represents time, and a vertical axis represents a frequency.

The following describes a case of receiving the received signal, which corresponds the transmitted signal reflected by the person candidate after modulation is performed by using the chirp signals corresponding to one cycle T illustrated in FIG. 25A. As illustrated in FIG. 25B, when the timing of reception of the received signal is not matched with the timing of demodulation, a section in which an expected signal cannot be obtained arises.

In a case of using PN code modulation, the extension parts 521 and 522 are respectively added at the front and the rear of the main body part 510 of the PN code 500 corresponding to one cycle as illustrated in FIG. 23. In a case of continuously transmitting the chirp signals, the chirp signals, whose frequency changes as illustrated in FIG. 25C, are transmitted. Thus, assuming that the chirp signals corresponding to the one cycle T in FIG. 25C is the main body part, extension parts are extracted from the parts at the front and the rear of the main body part to obtain an extended chirp signal exhibiting a temporal change in frequency as illustrated in FIG. 25D. In a case of modulating the carrier using this extended chirp signal, there is a portion in which the frequency discontinuously changes if the reception timing of the received signal and the demodulation timing are not matched with each other. Therefore, as illustrated in FIG. 25E, a signal having a frequency different from a proper frequency is generated corresponding to a mismatching period.

Considering above, in the second embodiment, a chirp signal corresponding to the one cycle T is extended forward and backward with continuity. Specifically, as illustrated in FIG. 25F, the extended chirp signals is obtained by setting the chirp signal of the one cycle T as a main body part 530, and joining, to the front and the rear of the main body part 530, extension parts 531 whose frequencies continuously change from the main body part 530 with the lapse of time. In a case of modulating the carrier by using the extended chirp signal illustrated in FIG. 25F, a discontinuous portion of frequency does not appear. In this case, a signal having a frequency corresponding to a distance difference between the estimated position of the person candidate and the actual position can be obtained over the entire detection section, as illustrated in FIG. 25G. As a result, in the first modification of the first embodiment, a shift between the actual estimated position and the estimated position estimated from the obtained signal can be correctly specified.

In the above description, although the main body part corresponds to one cycle of the spreading sequence, the main body part may correspond to an integral multiple of a cycle of the spreading sequence.

In the second embodiment, the modulation unit 121 modulates the carrier by using the extended PN code obtained by adding the extension parts 521 and 522 having a predetermined number of bits to the front and/or the rear of the main body part 510 of one cycle of the PN code. Thus, even if there is an error in the estimated position of the person candidate, that is, an error in the delay time, the problem that matching and mismatching cannot cancel out each other by the demodulation unit 122 is not caused so long as the error falls within a range of the extension parts 521 and 522. As a result, a shift of the actual position from the estimated position of the person candidate can be detected within the range of the extension parts 521 and 522.

The modulation unit 121 modulates the carrier by using the extended chirp signal obtained by adding, to at the front and/or the rear of the main body part 530 of one cycle of the chirp signal, the extension part 531 corresponding to a predetermined period that is continuous toward the main body part 530 and having the same change rate as the change rate of the frequency of the main body part 530 with the lapse of time. Thus, even if the reception timing of the received signal shifts from the demodulation timing using the chirp signal, a signal having a frequency corresponding to the distance difference between the estimated position of the person candidate and the actual position can be obtained. As a result, the shift between the estimated position and the actual position can be correctly specified.

Third Embodiment

With the spread spectrum modulation scheme, it is possible to determine whether an obstacle is present at a specific distance can be found, but it is hard to detect obstacles at other distances. That is, with the spread spectrum modulation scheme, obstacles present at positions other than the estimated position cannot be detected. The third embodiment describes a driving support apparatus, a vehicle, and a driving support method that can detect other obstacles even in the person checking mode.

Figure 26:
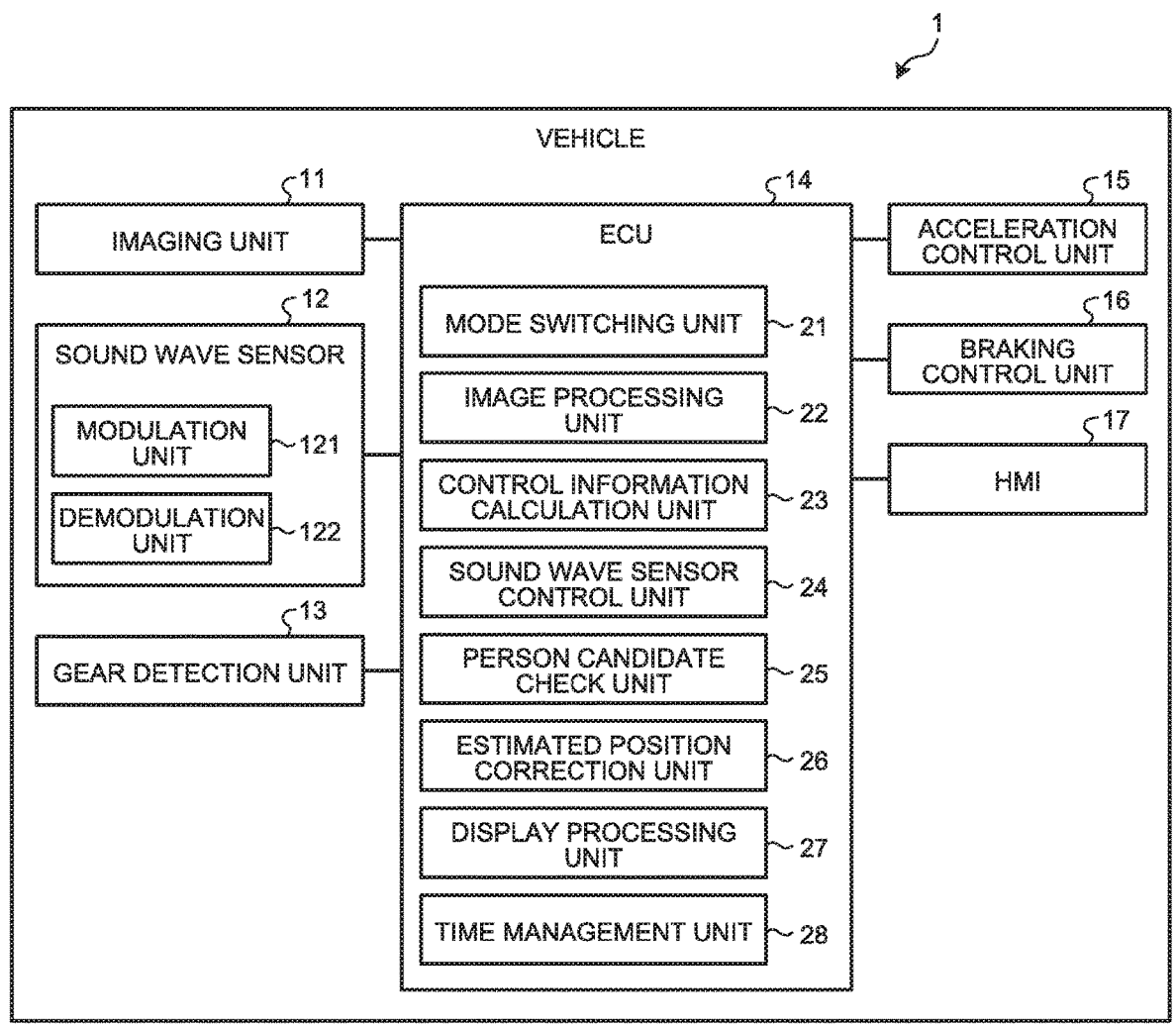
FIG. 26 is a block diagram schematically illustrating a configuration example of a vehicle according to a third embodiment.

FIG. 26 is a block diagram schematically illustrating a configuration example of the vehicle according to the third embodiment. The following describes portions different from those in the embodiments described above. In the vehicle 1 according to the third embodiment, a time management unit 28 is disposed in the ECU 14. When a mode (first mode) for detecting the obstacle by using normal pulse waves is switched to a mode (second mode) for detecting the obstacle at a specific distance, the time management unit 28 starts to count an interruption time of the first mode from the time of the switching. When the interruption time of the first mode exceeds a predetermined time, the time management unit 28 temporarily interrupts the second mode and instructs the mode switching unit 21 to insert the first mode. On receiving the instruction to insert the first mode, the mode switching unit 21 performs the first mode for detecting the obstacle using normal pulse waves for a predetermined time, and switches the mode to the second mode before the interruption again. The time management unit 28 starts to count the interruption time again at the time when the mode is switched to the second mode before the interruption.

Figure 27:
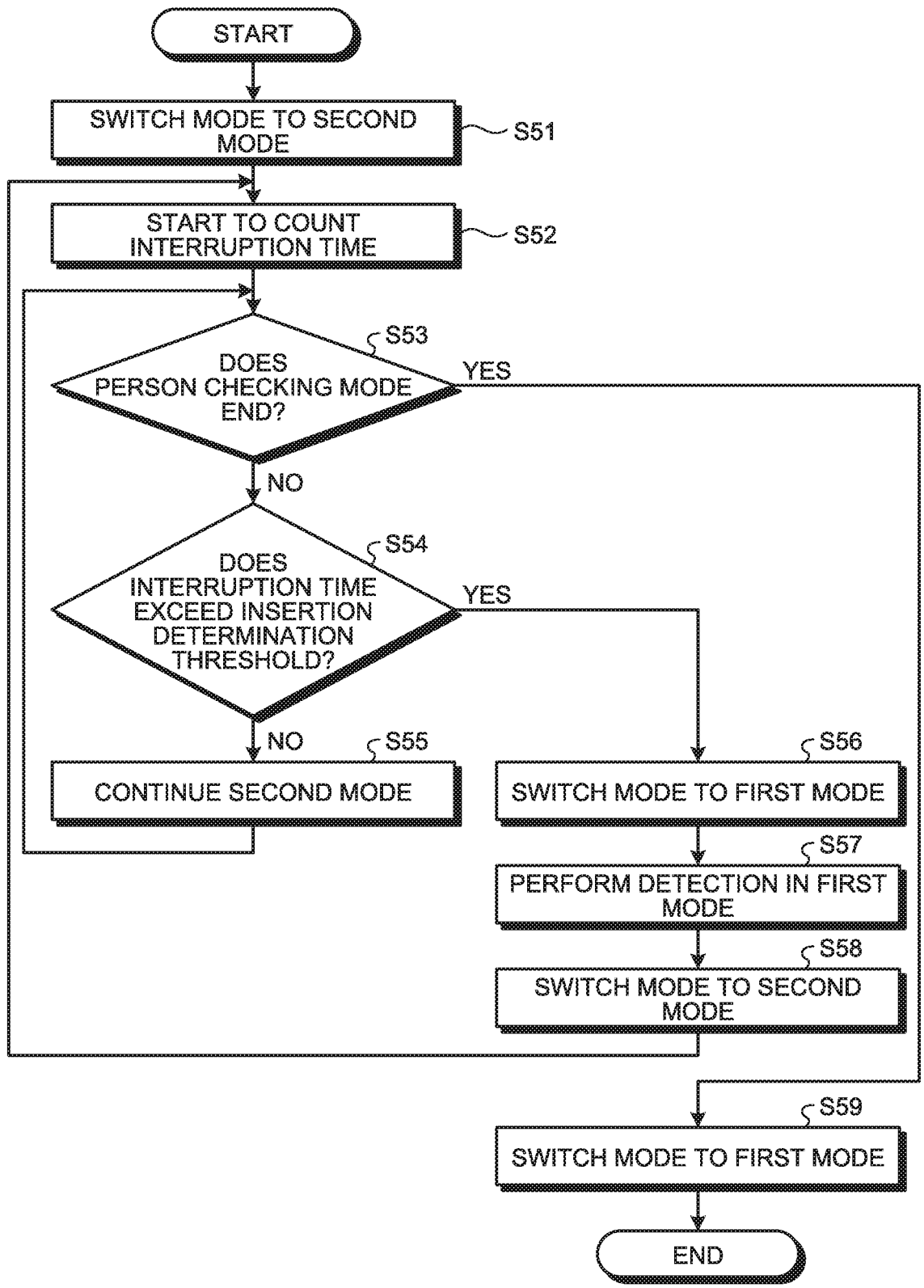
FIG. 27 is a flowchart illustrating an example of a procedure of mode switching control processing in a case of a person checking mode according to the third embodiment.

FIG. 27 is a flowchart illustrating an example of a procedure of mode switching control processing in a case of the person checking mode according to the third embodiment. When the control mode of the vehicle 1 is switched to the second mode from the first mode for detecting the obstacle using normal pulse waves (Step S51), the time management unit 28 starts to count the interruption time of the first mode (Step S52).

Subsequently, the time management unit 28 determines whether or not the person checking mode ends (Step S53). For example, in a case in which the person candidate is not detected and the mode is switched to the backward movement mode, or in a case in which the gear of the vehicle 1 is switched to a gear position other than the backward gear from the backward gear, the mode is switched to the forward movement mode, and a check for a person in the rear is not required, the time management unit 28 determines that the person checking mode ends.

When the person checking mode does not end (No at Step S53), the time management unit 28 determines whether or not the interruption time exceeds an insertion determination threshold (Step S54). When the interruption time does not exceed the insertion determination threshold (No at Step S54), the time management unit 28 continues the second mode (Step S55). Thereafter, processing is returned to Step S53.

When the interruption time exceeds the insertion determination threshold at Step S54 (Yes at Step S54), the time management unit 28 instructs the mode switching unit 21 to insert the first mode. The mode switching unit 21 switches the second mode to the first mode (Step S56), and performs detection in the first mode (Step S57). In the first mode, transmitted signals of the pulse waves are transmitted from the sound wave sensor 12, and received signals as reflected waves from the obstacle are received to detect the obstacle. After performing the first mode for a predetermined time, the mode switching unit 21 switches the first mode to the second mode (Step S58). Thereafter, processing is returned to Step S52. Step S57 may be performed by a method of advancing processing to the next step based on a duration time of the first mode, or a method of advancing processing to the next step based on the number of times of measurement in the first mode.

When the person checking mode ends at Step S53 (Yes at Step S53), the mode switching unit 21 switches the mode to the first mode (Step S59), and processing is terminated.

Figure 28:
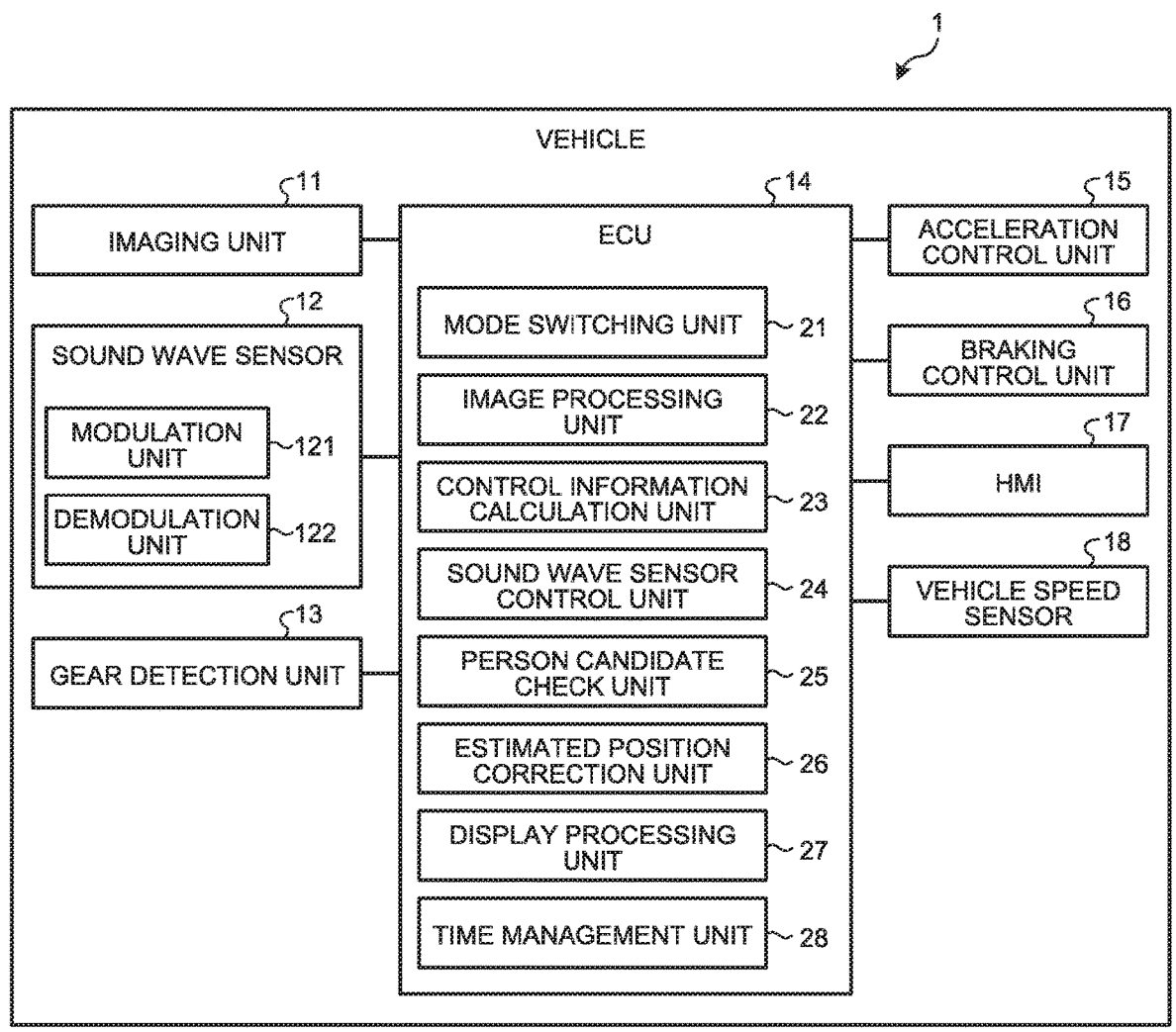
FIG. 28 is a block diagram schematically illustrating another configuration example of the vehicle according to the third embodiment.

The determination on whether or not to insert the first mode in the person checking mode may be performed based on the speed of the vehicle. FIG. 28 is a block diagram schematically illustrating another configuration example of the vehicle according to the third embodiment. The following describes portions different from those in the embodiments described above. In this example, the vehicle 1 further includes a vehicle speed sensor 18 that detects the speed of the vehicle 1. The vehicle speed sensor 18 outputs a detected speed of the vehicle 1 to the ECU 14.

Even in a case in which the interruption time exceeds a predetermined time, the time management unit 28 continues the second mode when the vehicle speed acquired from the vehicle speed sensor 18 is equal to or smaller than a predetermined value. In a case in which the vehicle speed acquired from the vehicle speed sensor 18 is larger than the predetermined value, the time management unit 28 temporarily interrupts the second mode, and instructs the mode switching unit 21 to insert the first mode.

Figure 29:
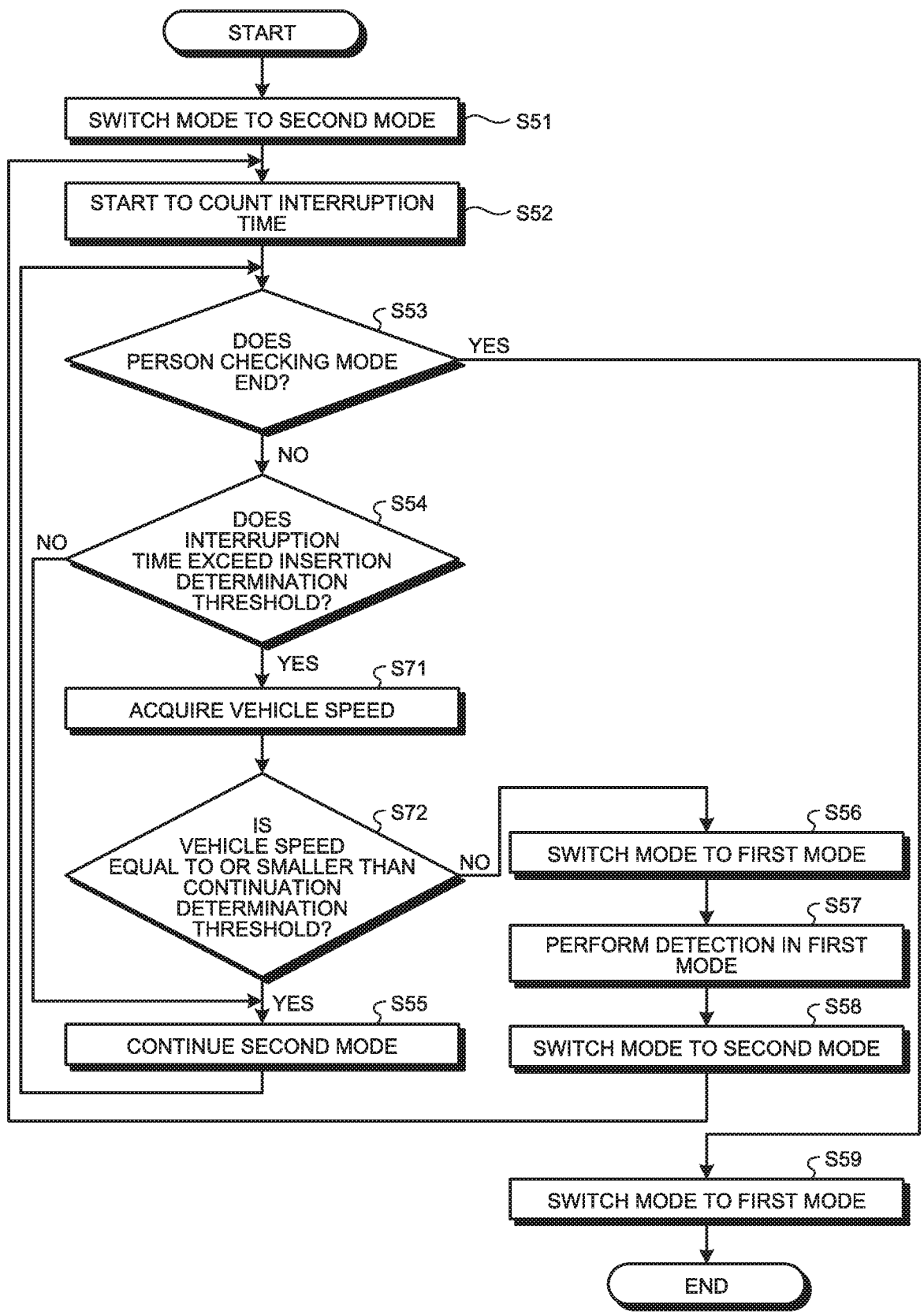
FIG. 29 is a flowchart illustrating another example of a procedure of mode switching control processing in a case of the person checking mode according to the third embodiment.

FIG. 29 is a flowchart illustrating another example of a procedure of mode switching control processing in a case of the person checking mode according to the third embodiment. The following describes portions different from those in the flowchart of FIG. 27.

When the interruption time exceeds the insertion determination threshold at Step S54 (Yes at Step S54), the time management unit 28 acquires the vehicle speed from the vehicle speed sensor 18 (Step S71), and determines whether the vehicle speed is equal to or smaller than a continuation determination threshold (Step S72). When the vehicle speed is equal to or smaller than the continuation determination threshold (Yes at Step S72), the mode switching unit 21 continues the second mode (Step S55). Thus, in a case in which the vehicle speed is close to a stopped state, it is possible to give a higher priority to detection of the person candidate than detection of other obstacles in the first mode. The continuation determination threshold of the vehicle speed may be zero, for example, and no restriction may be imposed on a duration time of the second mode only when the vehicle 1 is completely stopped. Thereafter, processing is returned to Step S53.

When the vehicle speed exceeds the continuation determination threshold at Step S72 (No at Step S72), processing is shifted to Step S56.

In the third embodiment, when a state in which control is performed by the sound wave sensor 12 in the second mode continues for a time longer than the predetermined time, the mode is switched to the first mode for detecting the obstacle using pulse waves. Thus, the time of the state in which other obstacles cannot be detected in the person checking mode can be shortened.

Fourth Embodiment

The fourth embodiment describes a driving support apparatus, a vehicle, and a driving support method that can increase electric power of the received signal by using a plurality of sound wave sensors.

Figure 30:
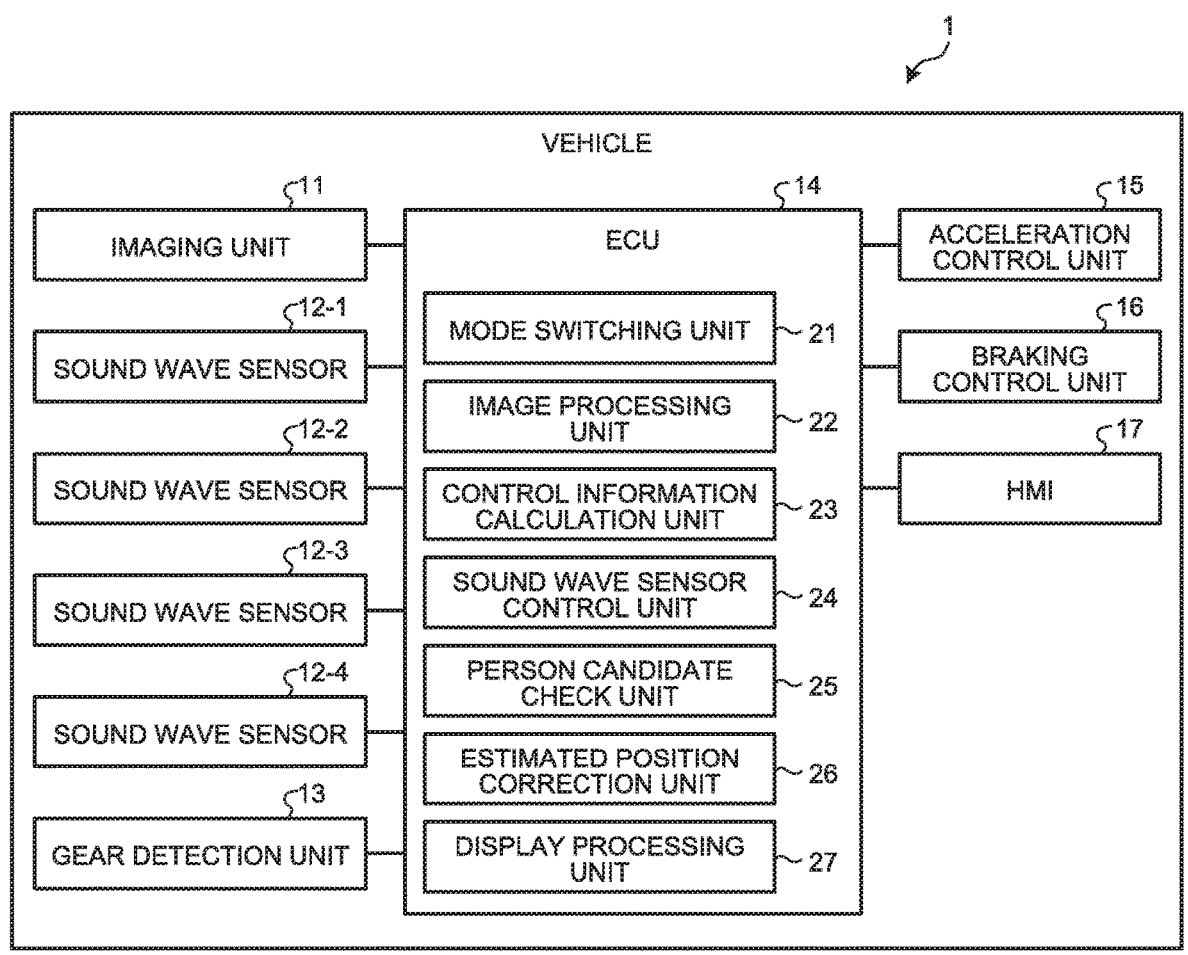
FIG. 30 is a block diagram schematically illustrating a configuration example of a vehicle including a driving support apparatus according to a fourth embodiment.
Figure 31A:
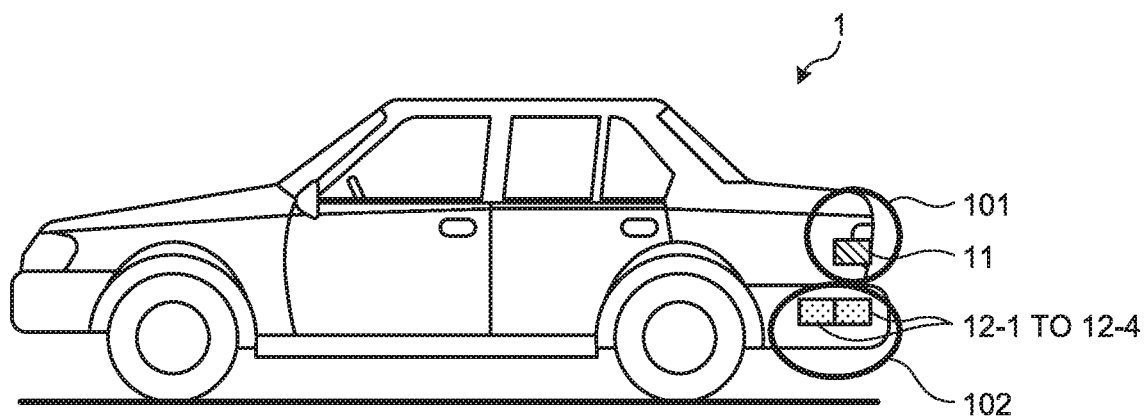
FIG. 31A is a side view schematically illustrating an example of the vehicle according to the fourth embodiment.
Figure 31B:
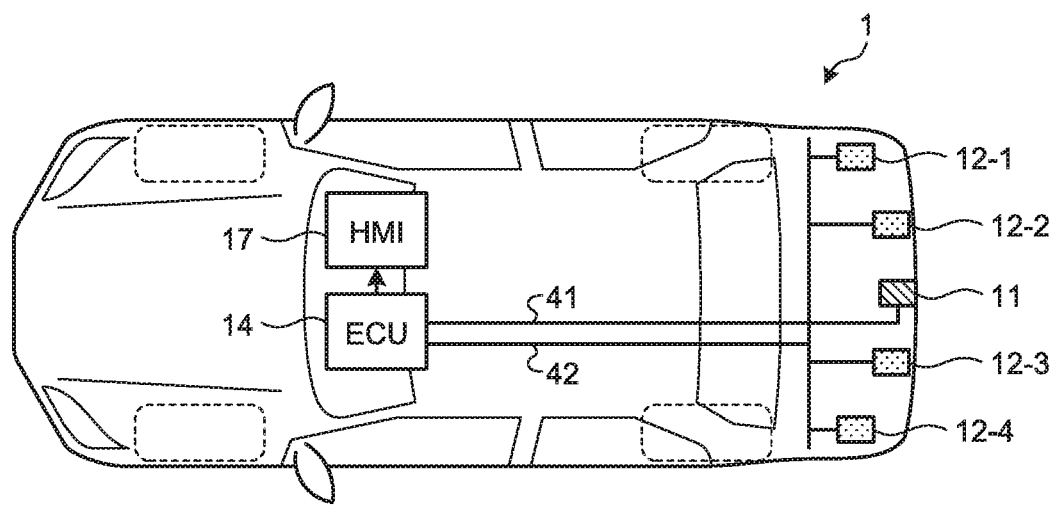
FIG. 31B is a top view schematically illustrating an example of the vehicle according to the fourth embodiment.

FIG. 30 is a block diagram schematically illustrating a configuration example of the vehicle including the driving support apparatus according to the fourth embodiment. FIG. 31A and FIG. 31B are diagrams schematically illustrating an example of the vehicle according to the fourth embodiment, FIG. 31A is a side view, and FIG. 31B is a top view. The following describes portions different from those in the embodiments described above.

In the fourth embodiment, a plurality of sound wave sensors 12 are disposed in the vehicle 1. Herein, described is a case in which four sound wave sensors 12-1 to 12-4 are disposed. Each of the sound wave sensors 12-1 to 12-4 does not include the modulation unit and the demodulation unit. As illustrated in FIG. 31A and FIG. 31B, the four sound wave sensors 12-1 to 12-4 are disposed on the rear bumper 102 substantially at regular intervals and at the same height.

Figure 32:
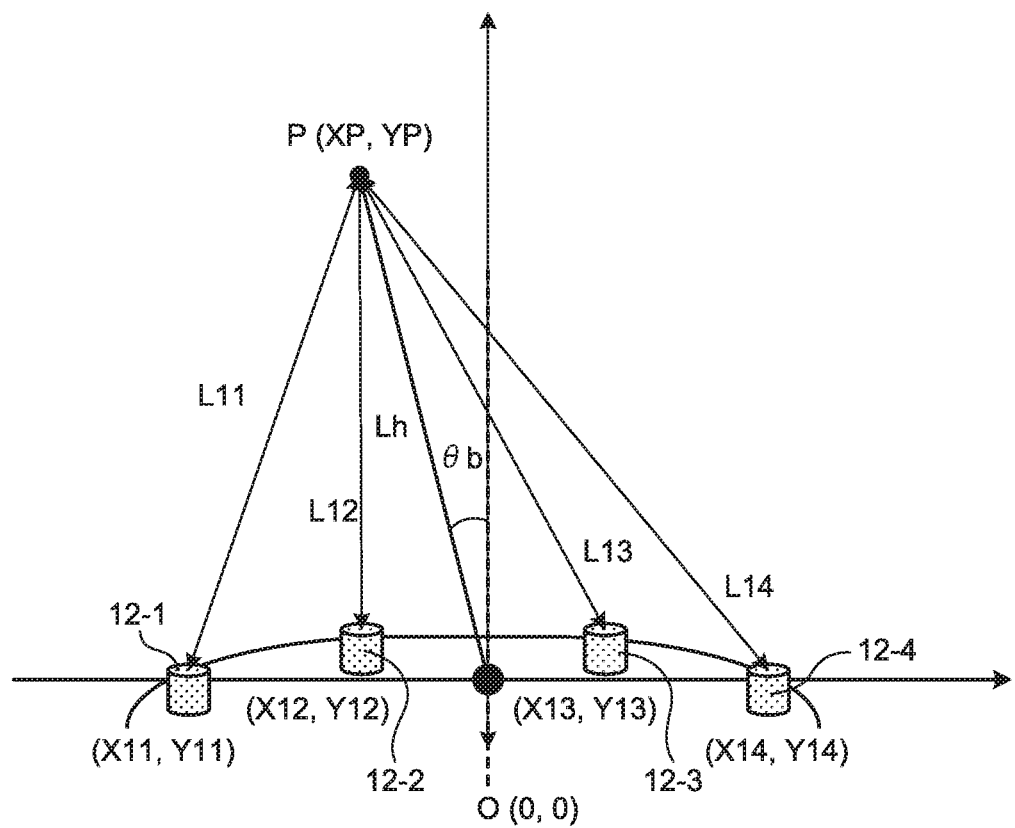
FIG. 32 is a diagram schematically illustrating a relation among an imaging unit, sound wave sensors, and the estimated position of the person candidate.
Figure 33:
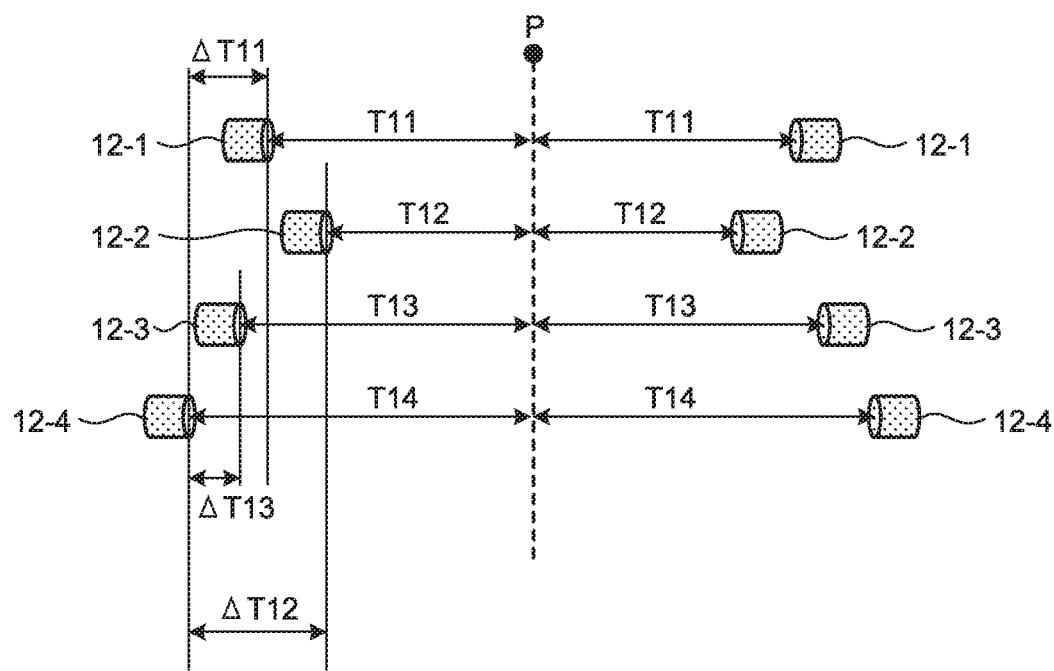
FIG. 33 is a diagram schematically illustrating a relation among propagation times during which a transmitted signal transmitted from the sound wave sensor is reflected by the person candidate to be returned as the received signal.

The control information calculation unit 23 calculates, as control information, an estimated propagation time between each of the sound wave sensors 12-1 to 12-4 and the estimated position, and a time difference as a difference in the estimated propagation time between a specific sound wave sensor, whose estimated propagation time is the longest, and the other sound wave sensors, and gives the control information to the sound wave sensor control unit 24. FIG. 32 is a diagram schematically illustrating a relation among the imaging unit, the sound wave sensors, and the estimated position of the person candidate. FIG. 33 is a diagram schematically illustrating a relation among propagation times during which the transmitted signal transmitted from the sound wave sensor is reflected by the person candidate to be returned as the received signal.

The estimated propagation time is calculated by using a method similar to that of the first embodiment. As illustrated in FIG. 32, a positional relation between the imaging unit 11 and the sound wave sensors 12-1 to 12-4 on the vehicle 1 is known in advance. Assuming that coordinates of the sound wave sensors 12-1 to 12-4 are (X11, Y11), (X12, Y12), (X13, Y13), and (X14, Y14), estimated distances L11 to L14 are obtained by using a method similar to the expression (3). By using the estimated distances L11 to L14 and the sonic speed V at a temperature at the time of calculation, estimated propagation times T11 to T14 are obtained by using a method similar to the expression (4). In this case, relation among the estimated propagation times is T14>T13>T11>T12.

Based on the estimated propagation times T11 to T14 of the sound wave sensors 12-1 to 12-4, the control information calculation unit 23 calculates differences in the estimated propagation times between the other sound wave sensors and the specific sound wave sensor whose estimated propagation time is the longest. As illustrated in FIG. 33, the specific sound wave sensor whose estimated propagation time is the longest is the sound wave sensor 12-4. Thus, time differences ΔT11 to ΔT13 between the estimated propagation time T14 and the estimated propagation times T11 to T13 of the other sound wave sensors 12-1 to 12-3. The time differences ΔT11 to ΔT13 are obtained by the following expressions (5-1) to (5-3).

$$\Delta T11 = T14 - T11 \quad (5\text{-}1)$$

$$\Delta T12 = T14 - T12 \quad (5\text{-}2)$$

$$\Delta T13 = T14 - T13 \quad (5\text{-}3)$$

In the person checking mode, the sound wave sensor control unit 24 controls the transmission time of the sound waves from each of the sound wave sensors 12-1 to 12-4 such that the sound waves from those sound wave sensors 12-1 to 12-4 are enhanced each other at the estimated position, that is, the sound waves from the sound wave sensors 12-1 to 12-4 arrive at the estimated position at the same time. Accordingly, the sound wave sensor control unit 24 controls the transmission time of the sound waves from the sound wave sensors 12-1 to 12-4 by using the time differences ΔT11 to ΔT13.

In this case, after transmitting the sound waves at time t10 by the sound wave sensor 12-4 that is the most distant from the estimated position, the sound wave sensor control unit 24 performs control to transmit the sound waves from the sound wave sensor 12-3 at time t10+ΔT13, transmit the sound waves from the sound wave sensor 12-1 at time t10+ΔT11, and transmit the sound waves from the sound wave sensor 12-2 at time t10+ΔT12. In this way, transmitting sound waves by the sound wave sensors 12-1 to 12-3 with time differences from the sound wave sensor 12-4, which is located most distant from the estimated position, the sound waves arrive at the estimated position at the same time. As a result, the sound waves are combined at the estimated position to be a sound wave having high strength. When the sound wave having high strength is reflected by the person candidate, an echo as a reflected wave also becomes a sound wave having high strength. The echo having high strength is not buried in the noise, and can be detected by each of the sound wave sensors 12-1 to 12-4.

When the phases of the sound waves of all the sound wave sensors 12 are the same at the time of starting transmission of the sound waves, the phases of the sound waves at the time of arriving at the estimated position become the same, and the sound waves are combined to be added up. When there is a difference in a transmission frequency among the sound wave sensors 12-1 to 12-4, the phases are gradually shifted from each other. However, at least in a certain period of time immediately after arriving of the sound waves, the phases can be recognized as being the same.

After transmitting the transmitted signal by each of the sound wave sensors 12-1 to 12-4, the sound wave sensor control unit 24 gives, to the person candidate check unit 25, information including the reception status of the received signal that is the transmitted signal reflected by the person candidate. The information including the reception status includes the time of flight of the sound wave from when the transmitted signal is transmitted by each of the sound wave sensors 12-1 to 12-4 until the received signal is received.

In a case in which the received signal is not received during a predetermined period equal to or longer than the estimated time of flight of each of the sound wave sensors 12-1 to 12-4 after transmitting the sound wave, it is determined that the received signal is not received, and the propagation time becomes information indicating that the received signal is not received.

The driving support method according to the fourth embodiment is the same as that illustrated in FIG. 13 in the first embodiment. However, at Step S21, the sound wave sensor control unit 24 controls transmission of the sound waves such that the sound waves from the sound wave sensors 12-1 to 12-4 arrive at the estimated position at the same time.

The sound waves subjected to spread spectrum modulation may be transmitted by applying the sound wave sensors 12-1 to 12-4 including the modulation unit 121 and the demodulation unit 122 described in the first to the third embodiments to the sound wave sensors 12-1 to 12-4 according to the fourth embodiment, or the sound waves may be transmitted by using the normal pulse scheme. In a case in which the sound wave is a continuous wave modulated with the spread spectrum modulation scheme, when there is a difference in an oscillation frequency among the sound wave sensors 12-1 to 12-4, the phases of the sound waves arriving at the estimated position may be gradually shifted from an in-phase state. However, the problem of phase shift can be solved by using a method of supplying a common clock to the sound wave sensors 12-1 to 12-4 from the ECU 14, or a method of utilizing the common clock supplied onto a bus of an on-vehicle LAN connecting the ECU 14 with the sound wave sensors 12-1 to 12-4, in order to make a phase reference of the carrier such that the carrier synchronized among all the sound wave sensors 12-1 to 12-4 is subjected to spread spectrum modulation.

In this way, in a case of detecting the person candidate with the imaging unit 11, the driving support apparatus according to the fourth embodiment calculates the estimated position of the person candidate from the image data and calculates the estimated propagation time of the sound waves from the sound wave sensors 12-1 to 12-4. The sound wave sensors 12-1 to 12-4 are controlled such that the sound waves from the sound wave sensors 12-1 to 12-4 arrive at the estimated position at the same time. Thus, the sound waves strengthen each other at the estimated position, and the strength of the received signal as the sound wave reflected by the person candidate becomes higher than the noise level. In a case in which a person is present at the estimated position, the received signal having high strength is detected by each of the sound wave sensors 12-1 to 12-4, and presence of the person can be checked. Specifically, even at the time of rainfall or in a case in which traveling sound of a tire of the vehicle 1 is present as background noise, the echoes that are combined and reflected sound waves from the sound wave sensors 12-1 to 12-4 are detected, so that the echoes are not buried in the background noise, and the person can be detected.

Increasing the strength of the transmitted signal from the sound wave sensor is also effective means for obtaining the received signal having high strength. For example, in a case in which the estimated position of the person candidate is distant, and the echo and the noise level have a size relation as illustrated in FIG. 4A, when the strength of the transmitted signal ST1 from the sound wave sensor is increased, the signal level of the received signal SR1 is raised in proportion thereto to be higher than the noise level, and the received signal SR1 is expected to be able to be detected. Interference that interferes with detection includes the reverberation N1 of sound wave transmission and the reflected wave N2 of the sound wave from the road surface. When the strength of the transmitted signal ST1 from the sound wave sensor is increased, the reverberation N1 and the reflected wave N2 are increased in proportion thereto, but the reverberation N1 is resolved in a short time and brings no influence, and the reflected wave N2 from the road surface does not exceed the received signal SR1 to interfere with detection so long as the received signal SR1 and the reflected wave N2 are increased at the same ratio in proportion to the strength of the transmitted signal ST1 because the reflected wave N2 is lower than the signal level of the received signal SR1 in this case.

Assuming that the method of modulating the sound waves with the spread spectrum modulation scheme is referred to as a method A, the method of controlling the transmission timing such that the sound waves are enhanced each other at the estimated position is referred to as a method B. and the method of increasing the strength of the transmitted signal from the sound wave sensor is referred to as a method C, the three methods A, B, and C can be optionally combined with each other to be performed. Although each of the methods A, B, and C may be singly performed to exhibit an effect, but the effect can be enhanced by combining A and B, B and C, C and A, and A, B, and C to be performed. For example, in a case in which the level of the background noise is high, the estimated position of the person candidate is distant, and the received signal is expected to be small, the method (A) of modulating the sound waves with the spread spectrum modulation scheme, the method (B) of controlling the transmission timing such that the sound waves are enhanced each other at the estimated position, and the method (C) of increasing the strength of the transmitted signal from the sound wave sensor may all be performed. In a configuration in which clock phases are difficult to be synchronized among the sound wave sensors 12-1 to 12-4, the method (A) of modulating the sound waves with the spread spectrum modulation scheme and the method (C) of increasing the strength of the transmitted signal from the sound wave sensor may be combined to be performed. In a case in which the estimated position of the person candidate is relatively near and the cycle of the spreading sequence is short, only the method (B) of controlling the transmission timing such that the sound waves are enhanced each other at the estimated position and the method (C) of increasing the strength of the transmitted signal of the sound wave sensor may be performed without spreading the frequency. In a case in which the estimated position of the person candidate is near and the reflected wave N2 from the road surface is dominant interference, only the method (B) of controlling the transmission timing such that the sound waves are enhanced each other at the estimated position may be performed while preventing the frequency from being spread and the strength of the transmitted signal from being increased.

Fifth Embodiment

In the foregoing first to the fourth embodiments, the height of the person candidate present at the estimated position is not considered. The fifth embodiment describes a driving support apparatus, a vehicle, and a driving support method that can determine whether the person candidate present at the estimated position is a person while taking the height of the person candidate into consideration.

Figure 34:
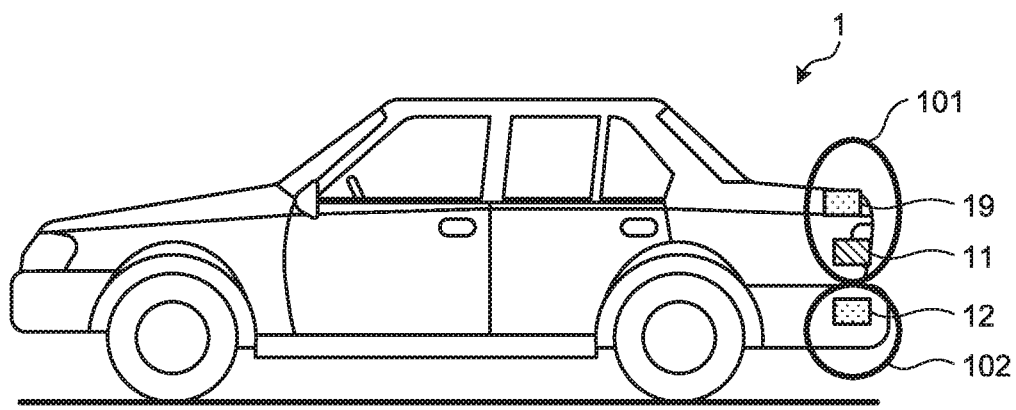
FIG. 34 is a side view schematically illustrating an example of a vehicle according to a fifth embodiment.

FIG. 34 is a side view schematically illustrating an example of the vehicle according to the fifth embodiment. Exemplified herein is the vehicle 1 according to the first embodiment. In the fifth embodiment, a sound wave sensor 19 is further disposed on the trunk panel 101 at the rear of the vehicle 1. The sound wave sensor 19 is disposed at a position higher than the sound wave sensor 12.

The configuration of the vehicle 1 including the driving support apparatus according to the fifth embodiment is the same as that in FIG. 1 in the first embodiment. However, the sound wave sensor control unit 24 acquires the reception status of the sound waves from when the transmitted signals are transmitted from the sound wave sensors 12 and 19 in the person checking mode until the received signals reflected by the person candidate are received by the sound wave sensors 12 and 19. The reception status includes the time of flight from when the transmitted signals are transmitted from the sound wave sensors 12 and 19 until the received signals are returned. The sound wave sensor control unit 24 gives the reception status to the person candidate check unit 25.

Figure 35:
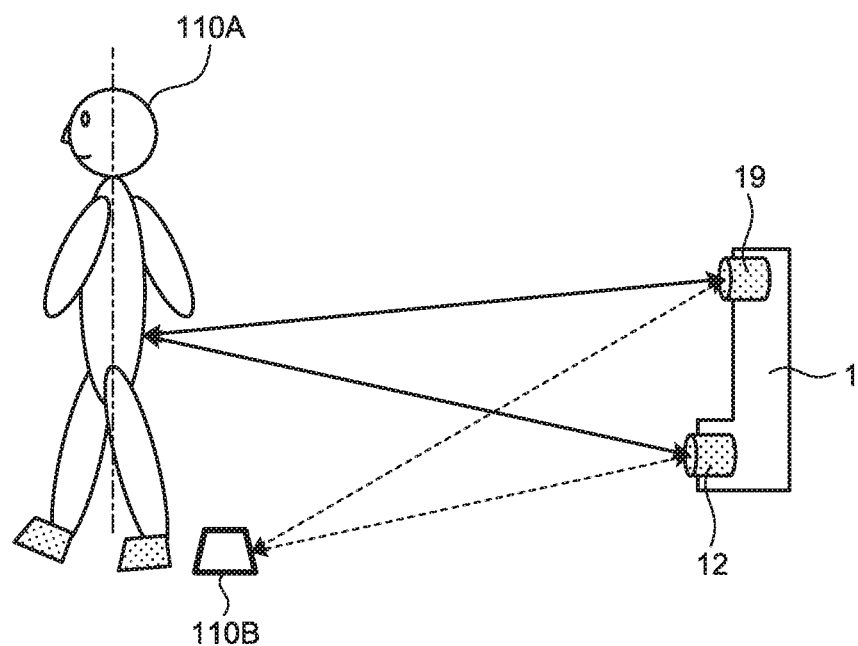
FIG. 35 is a diagram illustrating an example of a method of determining a person candidate according to the fifth embodiment.

The person candidate check unit 25 further has a function of determining whether the person candidate is a person using the time of flight from the sound wave sensors 12 and 19. FIG. 35 is a diagram illustrating an example of a method of determining the person candidate according to the fifth embodiment. The sound wave sensor 19 is installed at a position higher than the sound wave sensor 12. Thus, in a case in which a person is not actually present at the estimated position of the person candidate and an object is present at a lower position such as an object 110B on the road, the time of flight from the sound wave sensor 12 is greatly shorter than the time of flight from the sound wave sensor 19. When a person is actually present at the estimated position of the person candidate, the time of flight from the sound wave sensor 12 is equal to the time of flight from the sound wave sensor 19, so that it is possible to discriminate between a case in which a person is present at the estimated position of the person candidate and a case in which there is only an object on the road.

That is, in a case in which the time of flight of the sound wave from the sound wave sensor 12 is substantially equal to the time of flight of the sound wave from the sound wave sensor 19, the person candidate check unit 25 determines that the person candidate is a person 110A. In a case in which the time of flight of the sound wave from the sound wave sensor 12 is greatly shorter than the time of flight of the sound wave from the sound wave sensor 19, the person candidate check unit 25 determines that the person candidate is not a person but the object 110B on the road. In this way, the person candidate check unit 25 can determine whether the person candidate at the estimated position is the person 110A.

Figure 36:
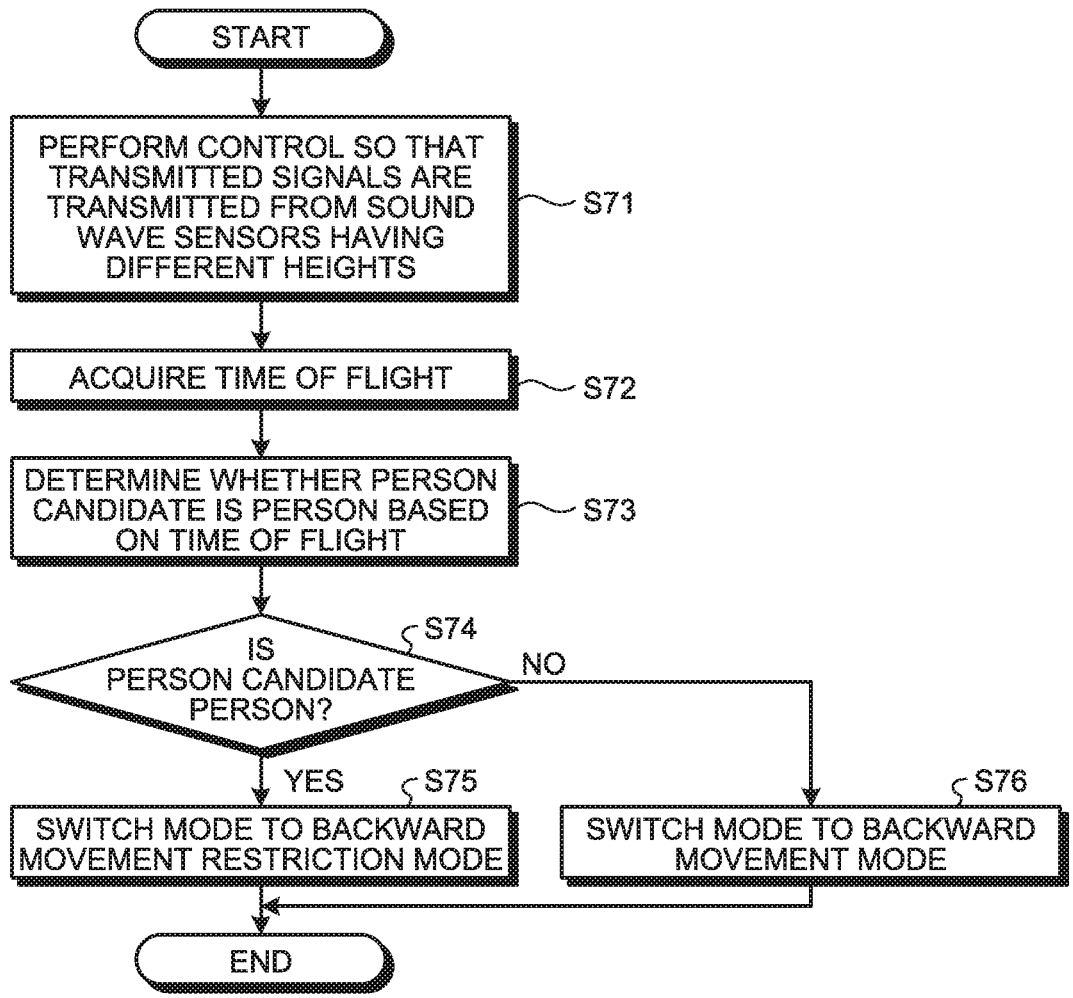
FIG. 36 is a flowchart illustrating an example of a procedure of determination processing for the person candidate at an estimated position according to the fifth embodiment.

FIG. 36 is a flowchart illustrating an example of a procedure of determination processing for the person candidate at the estimated position according to the fifth embodiment. The sound wave sensor control unit 24 controls the sound wave sensors 12 and 19 having different heights to transmit the transmitted signals (Step S71), and the transmitted signals are transmitted from the sound wave sensors 12 and 19. The transmitted signals are reflected by the person candidate, and detected by the sound wave sensors 12 and 19 as the received signals. Each of the sound wave sensors 12 and 19 gives the time of flight to the person candidate check unit 25 as the reception status, and the person candidate check unit 25 acquires the time of flight (Step S72).

The person candidate check unit 25 determines whether the person candidate is a person based on the times of flight from the two sound wave sensors 12 and 19 (Step S73). That is, the person candidate check unit 25 determines whether the time of flight from the sound wave sensor 12 is either equal to or greatly shorter than the time of flight from the sound wave sensor 19. When the time of flight from the sound wave sensor 12 is equal to the time of flight from the sound wave sensor 19, it is determined that the person candidate is the person 110A. When the time of flight from the sound wave sensor 12 is greatly shorter than the time of flight from the sound wave sensor 19, it is determined that the person candidate is the object 110B on the road. When the time of flight from the sound wave sensor 12 is equal to the time of flight from the sound wave sensor 19 within an error range, it is assumed that the time of flight from the sound wave sensor 12 is equal to the time of flight from the sound wave sensor 19. Furthermore, when the time of flight from the sound wave sensor 12 is not equal to the time of flight from the sound wave sensor 19 beyond the error range, and the time of flight from the sound wave sensor 12 is shorter than the time of flight from the sound wave sensor 19, it is assumed that the time of flight from the sound wave sensor 12 is greatly shorter than the time of flight from the sound wave sensor 19.

As a result of determination, if the person candidate is a person (Yes at Step S74), for example, the mode switching unit 21 switches the mode to the backward movement restriction mode (Step S75), and processing is terminated. When the person candidate is not a person (No at Step S74), for example, the mode switching unit 21 switches the mode to the backward movement mode (Step S76), and processing is terminated.

In the fifth embodiment described above, a case in which the sound wave sensor 19 is disposed at a position higher than the sound wave sensor 12 is exemplified, but a height relation may be reversed. In the above description, although the fifth embodiment is applied to the first embodiment, the fifth embodiment can be applied to any one of the second to fourth embodiments.

In the fifth embodiment, in a case in which the person candidate is detected in the image data, the sound wave sensor 19 is disposed at the height different from that of the other sound wave sensors 12, and determines whether the person candidate is a person based on a difference in the time of flight at the time of transmitting the transmitted signals to the person candidate from the sound wave sensors 12 and 19. Thus, whether the person candidate is actually a person can be checked, so that the object on the road present at the estimated position can be prevented from erroneously detected to be a person to switch the mode to the backward movement restriction mode.

In the above description, described is a case of disposing the imaging unit 11 and the sound wave sensor 12 at the rear of the vehicle 1, and checking the person candidate detected from the image data when the vehicle 1 moves backward. However, the imaging unit 11 and the sound wave sensor 12 may be disposed on the front of the vehicle 1 to check the person candidate detected from the image data when the vehicle 1 moves forward. In the above description, described is a case in which the environment information acquisition unit is the imaging unit 11, and the person candidate is detected by using the image data taken by the imaging unit 11. However, the environment information acquisition unit may be a radar system. The sound wave sensor 12 may also function as the environment information acquisition unit, and check whether the object detected by the sound wave sensor 12 is a person utilizing the distance information acquired by the sound wave sensor 19.

Additionally, the configuration of the ECU 14 serving as the driving support apparatus can be implemented as hardware by a central processing unit (CPU) of an optional computer, a memory, and other large scale integrated circuits (LSI), and implemented as software by a computer program and the like loaded into a memory. Described herein is functional blocks implemented by those components cooperating with each other. Thus, those skilled in the art understand that these functional blocks can be implemented in various forms by only hardware, or by combining hardware and software.

According to the driving support apparatus, the vehicle, and the driving support method according to the present disclosure, a person who is present around a vehicle can be detected even in a situation in which there is noise.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A driving support apparatus comprising:
   a memory; and
   a hardware processor coupled to the memory and a sound wave sensor, the hardware processor being configured to
      select, as a transmission and reception scheme, either a pulse scheme or a spread spectrum modulation scheme, and
      control the sound wave sensor with the selected transmission and reception scheme,
   wherein, when the spread spectrum modulation scheme is selected as the transmission and reception scheme, the hardware processor causes the sound wave sensor to successively transmit and receive sound waves by using the spread spectrum modulation scheme,
   the hardware processor controls the sound wave sensor such that a continuous transmission period of the sound waves, which is applied when the spread spectrum modulation scheme is selected as the transmission and reception scheme, is equal to or longer than a cycle of a spreading sequence,
   the continuous transmission period of the sound waves, which is applied when the spread spectrum modulation scheme is selected as the transmission and reception scheme, includes
      a main body part that corresponds to an integral multiple of the cycle of the spreading sequence, and
      an extension part that is shorter than the cycle of the spreading sequence and provided at least one of at a head or at a rear end of the main body part, and
   a frequency signal of the extension part is continuously joined to a frequency signal of the main body part.

2. The driving support apparatus according to claim 1, wherein the spread spectrum modulation scheme is one of a direct spread scheme, a frequency hopping scheme, a linear frequency modulation scheme, and a combination of the direct spread scheme and the linear frequency modulation scheme.

3. The driving support apparatus according to claim 1, wherein, when there is a specific obstacle candidate representing a possibility that a specific obstacle is present around a vehicle, the hardware processor selects the transmission and reception scheme of the sound wave sensor based on a distance to the specific obstacle candidate.

4. The driving support apparatus according to claim 3, wherein, when the distance to the specific obstacle candidate is shorter than a predetermined distance, the hardware processor selects the pulse scheme as the transmission and reception scheme of the sound wave sensor.

5. The driving support apparatus according to claim 3, wherein, when the spread spectrum modulation scheme is selected as the transmission and reception scheme, the hardware processor selects the cycle of the spreading sequence based on the distance to the specific obstacle candidate.

6. The driving support apparatus according to claim 5, wherein the hardware processor selects the spreading sequence to have a longer cycle when the distance to the specific obstacle candidate is longer as compared with a case in which the distance to the specific obstacle candidate is shorter.

7. The driving support apparatus according to claim 3, wherein the specific obstacle candidate includes information that represents estimation of a presence of the specific obstacle and an estimated position at which the specific obstacle is present, and the specific obstacle includes any of a person, a wheelchair, a baby buggy, and a mobile object that has low reflectivity to sound waves.

8. The driving support apparatus according to claim 1, wherein the hardware processor is further configured to
   measure an interruption time of a mode in which the pulse scheme is selected as the transmission and reception scheme of the sound wave sensor,
   when the measured interruption time exceeds a predetermined value, interrupt a mode in which the transmission and reception scheme of the sound wave sensor is not the pulse scheme, and
   insert the mode in which the transmission and reception scheme is the pulse scheme.

9. The driving support apparatus according to claim 8, wherein, when vehicle speed information is equal to or smaller than a predetermined value, the hardware processor does not interrupt the mode, in which the transmission and reception scheme of the sound wave sensor is not the pulse scheme, even when the interruption time exceeds the predetermined value.

10. The driving support apparatus according to claim 1, wherein the hardware processor estimates a height of a specific obstacle candidate based on a flight distance of sound waves from two or more of the sound wave sensors having different heights, the specific obstacle candidate representing a possibility that a specific obstacle is present.

11. The driving support apparatus according to claim 1, wherein, when there is a specific obstacle candidate representing a possibility that a specific obstacle is present around a vehicle, the driving support apparatus
   compares an estimated position of the specific obstacle candidate with distance information to the specific obstacle candidate obtained from the sound wave sensor, and
   restricts approach of the vehicle to the specific obstacle candidate when the estimated position is matched with the distance information.

12. A driving support apparatus comprising:
   a memory; and
   a hardware processor coupled to the memory and a plurality of sound wave sensors, the hardware processor being configured to control the plurality of sound wave sensors such that, when there is a specific obstacle candidate representing a possibility that a specific obstacle is present around a vehicle, the hardware processor performs the control of the plurality of sound wave sensors by using at least one of
      a first control scheme in which a spread spectrum modulation scheme is used for the plurality of sound wave sensors as a transmission and reception scheme for sound waves,
      a second control scheme in which transmission power of the plurality of sound wave sensors is changed, and
      a third control scheme in which a transmission timing is controlled such that the sound waves transmitted by the plurality of sound wave sensors enhance each other at a position of the specific obstacle candidate.

13. The driving support apparatus according to claim 12, wherein the hardware processor performs, based on a distance to the specific obstacle candidate, the control of the plurality of sound wave sensors by using at least one of the first control scheme, the second control scheme, or the third control scheme.

14. The driving support apparatus according to claim 12, wherein the hardware processor performs, based on noise levels received from the plurality of sound wave sensors, the control of the plurality of sound wave sensors using at least one of the first control scheme, the second control scheme, or the third control scheme.

15. The driving support apparatus according to claim 12,
wherein a continuous transmission period of the sound waves is equal to or longer than a cycle of a spreading sequence, which is applied when the first control scheme is selected as the transmission and reception scheme,
the continuous transmission period of the sound waves includes
a main body part that corresponds to an integral multiple of the cycle of the spreading sequence, and
an extension part that is shorter than the cycle of the spreading sequence and provided at least one of at a head or at a rear end of the main body part, and
a frequency signal of the extension part is continuously joined to a frequency signal of the main body part.

16. The driving support apparatus according to claim 12,
wherein the first control scheme is one of a direct spread scheme, a frequency hopping scheme, a linear frequency modulation scheme, and a combination of the direct spread scheme and the linear frequency modulation scheme.

17. The driving support apparatus according to claim 12,
wherein the hardware processor selects the transmission and reception scheme of the plurality of sound wave sensors based on a distance to the specific obstacle candidate.

\* \* \* \* \*